US012781153B2

(12) United States Patent
Sbravati et al.

(10) Patent No.: US 12,781,153 B2
(45) Date of Patent: Nov. 3, 2026

(54) METHOD FOR MAKING BIO-SOURCED OIL DIELECTRIC FLUIDS

(71) Applicant: CARGILL, INCORPORATED, Wayzata, MN (US)

(72) Inventors: Alan Sbravati, Plymouth, MN (US); Ron Westerhout, Barendrecht (NL); Kevin R. Wirtz, Eden Prairie, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 584 days.

(21) Appl. No.: 18/548,563

(22) PCT Filed: Mar. 2, 2021

(86) PCT No.: PCT/US2021/020448
§ 371 (c)(1),
(2) Date: Aug. 31, 2023

(87) PCT Pub. No.: WO2022/186824
PCT Pub. Date: Sep. 9, 2022

(65) Prior Publication Data
US 2024/0158717 A1 May 16, 2024

(51) Int. Cl.
*H01B 3/20* (2006.01)
*B01D 15/18* (2006.01)
(Continued)

(52) U.S. Cl.
CPC .......... *C11B 3/001* (2013.01); *B01D 15/1871* (2013.01); *B01D 37/00* (2013.01); *H01B 3/20* (2013.01)

(58) Field of Classification Search
CPC ...... B01F 23/708; B01F 23/451; B01F 23/49; B01F 23/703; B01F 23/711;
(Continued)

(56) References Cited

U.S. PATENT DOCUMENTS

| | | | |
|---|---|---|---|
| 2,643,962 | A | 6/1953 | Lindhe |
| 3,305,526 | A | 2/1967 | Guttag |

(Continued)

FOREIGN PATENT DOCUMENTS

| | | | |
|---|---|---|---|
| CA | 2663001 A1 | 3/2008 | |
| CA | 2731684 A | 4/2010 | |

(Continued)

OTHER PUBLICATIONS

De Maria et al. "Phospholipases and their industrial applications," Applied Microbiology and Biotechnology, Jan. 13, 2007 (13.01. 20107), vol. 74, pp. 290-300.

(Continued)

*Primary Examiner* — Khanh T Nguyen

(57) ABSTRACT

Processes for processing bio-sourced oil to produce bio-sourced oil dielectric fluids can be carried out using an apparatus mounted on a mobile transport platform system having a total footprint of no more than about 30 $m^2$. The processes use a described array of pumps, heaters, filters, a degasser and vacuum system, and an additive metering/mixing valve system to achieve production under low energy and pressure conditions.

16 Claims, 4 Drawing Sheets

(51) Int. Cl.
*B01D 37/00* (2006.01)
*C11B 3/00* (2006.01)

(58) Field of Classification Search
CPC . B01F 25/1051; B01D 15/1871; B01D 15/22; B01D 19/0036; B01D 36/02; B01D 17/047; H01B 3/20; H01B 3/22; H01F 27/12; C09K 5/10; C11B 3/008
See application file for complete search history.

(56) References Cited

U.S. PATENT DOCUMENTS

| | | | |
|---|---|---|---|
| 3,565,855 | A | 2/1971 | Meltsner |
| 4,053,941 | A | 10/1977 | Shimizu et al. |
| 4,082,866 | A | 4/1978 | Link |
| 4,121,352 | A | 10/1978 | Lameris |
| 4,142,003 | A | 2/1979 | Sejpal |
| 4,498,992 | A | 2/1985 | Garrett, Jr. |
| 4,543,207 | A | 9/1985 | Sato |
| 4,857,150 | A | 8/1989 | Rival |
| 5,260,077 | A | 11/1993 | Carrick |
| 5,558,781 | A | 9/1996 | Buchold |
| 5,736,915 | A | 4/1998 | Goedde |
| 5,750,476 | A | 5/1998 | Nibert |
| 5,766,517 | A | 6/1998 | Goedde |
| 5,949,017 | A | 9/1999 | Oommen et al. |
| 6,037,537 | A | 3/2000 | Mcshane |
| 6,184,459 | B1 | 2/2001 | Mcshane |
| 6,280,659 | B1 | 8/2001 | Sundin |
| 6,352,655 | B1 | 3/2002 | Mcshane |
| 6,398,986 | B1 | 6/2002 | Mcshane |
| 6,485,659 | B1 | 11/2002 | Goedde |
| 6,613,250 | B2 | 9/2003 | Mcshane |
| 6,726,857 | B2 | 4/2004 | Goedde |
| 6,905,638 | B2 | 6/2005 | Corkran |
| 7,524,440 | B2 | 4/2009 | Rapp |
| 7,651,641 | B2 | 1/2010 | Corkran |
| 7,815,821 | B2 | 10/2010 | Rapp |
| 7,871,546 | B2 | 1/2011 | Corkran |
| 8,076,123 | B2 | 12/2011 | Chou |
| 8,097,187 | B2 | 1/2012 | Rapp |
| 8,192,782 | B2 | 6/2012 | Søe |
| 8,741,186 | B2 | 6/2014 | Pulido Sanchez |
| 9,240,259 | B2 | 1/2016 | Rebouillat |
| 10,712,105 | B1 | 7/2020 | Christensen |
| 2002/0049145 | A1 | 4/2002 | Cannon |
| 2002/0063487 | A1 | 5/2002 | Leijon |
| 2002/0109128 | A1 | 8/2002 | Mcshane |
| 2003/0164479 | A1 | 9/2003 | Goedde |
| 2008/0194442 | A1 | 8/2008 | Watts |
| 2008/0283803 | A1 | 11/2008 | Rapp |
| 2009/0140830 | A1 | 6/2009 | Amanullah |
| 2009/0270644 | A1 | 10/2009 | Kano |
| 2010/0097167 | A1 | 4/2010 | Corkran |
| 2011/0012071 | A1 | 1/2011 | Rapp |
| 2011/0188202 | A1 | 8/2011 | Han |
| 2012/0119862 | A1 | 5/2012 | Franklin |
| 2012/0139679 | A1 | 6/2012 | Rapp |
| 2013/0023683 | A1 | 1/2013 | Ruwwe |
| 2013/0099182 | A1 | 4/2013 | Rebouillat |
| 2013/0264527 | A1* | 10/2013 | Han ........................ H01B 3/20 252/579 |
| 2014/0110143 | A1 | 4/2014 | Han et al. |
| 2017/0009119 | A1 | 1/2017 | Hahn |
| 2018/0044606 | A1 | 2/2018 | Aoki |
| 2018/0075941 | A1 | 3/2018 | Martin |
| 2018/0294068 | A1 | 10/2018 | Aufdembrink |

FOREIGN PATENT DOCUMENTS

| | | | | |
|---|---|---|---|---|
| CA | 2754291 | A1 | 9/2010 | |
| CA | 2842815 | A1 | 2/2013 | |
| CN | 101278362 | A | 10/2008 | |
| CN | 101300644 | A | 11/2008 | |
| CN | 101278362 | B | 6/2012 | |
| CN | 102782051 | B | 2/2015 | |
| CN | 104508031 | A | 4/2015 | |
| CN | 104798143 | A | 7/2015 | |
| CN | 106118833 | A | 11/2016 | |
| CN | 106867638 | A | 6/2017 | |
| DE | 202005002390 | U1 | 6/2005 | |
| EP | 0108571 | A2 | 5/1984 | |
| EP | 0471071 | B1 | 8/1995 | |
| EP | 3642275 | A1 | 4/2020 | |
| GB | 498215 | A | 1/1939 | |
| GB | 0923190 | A | 4/1963 | |
| JP | 52-108406 | A | 9/1977 | |
| JP | 59-084992 | A | 5/1984 | |
| JP | 06212185 | A | 8/1994 | |
| JP | 07-013413 | U | 3/1995 | |
| JP | 09-122449 | A | 5/1997 | |
| JP | 2000-090740 | A | 3/2000 | |
| JP | 2004-083868 | A | 3/2004 | |
| JP | 2007173685 | A | 7/2007 | |
| JP | 2013-189563 | A | 9/2013 | |
| JP | 2014-501319 | A | 1/2014 | |
| JP | 5475600 | A | 4/2014 | |
| JP | 2016-073922 | A | 5/2016 | |
| JP | 2021-518972 | A | 8/2021 | |
| KR | 10-2019-0069388 | A | 6/2019 | |
| WO | 02062156 | W | 8/2002 | |
| WO | 2002062156 | A2 | 8/2002 | |
| WO | 2005/030679 | A2 | 4/2005 | |
| WO | 2007/029724 | A1 | 3/2007 | |
| WO | WO 2008/143830 | A1 * | 11/2008 | ............... C11B 3/00 |
| WO | 2012/091805 | A2 | 7/2012 | |
| WO | 2013052956 | A2 | 4/2013 | |
| WO | 2014/041553 | A1 | 3/2014 | |
| WO | 2014100649 | A1 | 6/2014 | |
| WO | 2018234697 | A1 | 12/2018 | |
| WO | 2019183213 | A1 | 9/2019 | |
| WO | 2019183214 | A1 | 9/2019 | |
| WO | 2022186825 | A1 | 9/2022 | |

OTHER PUBLICATIONS

Jiang et al. Degumming of vegetable oils by a novel phospholipase B from Pseudomonas fluorescens BIT-18,: Bioresource Technology, May 26, 2011 (May 26, 2011), vol. 102, pp. 8052-8056.

Anonymous ED—Anonymous: "IEEE guide for the reclamation of insulating oil and criteria for its use", IEEE Standard, Nov. 11, XP017600857.

* cited by examiner

METHOD FOR MAKING BIO-SOURCED OIL DIELECTRIC FLUIDS

CROSS-REFERENCE TO RELATED APPLICATIONS

This application is a national phase application of PCT Application No. PCT/US2021/020448, filed Mar. 2, 2021, which is incorporated by reference herein in its entirety.

FIELD OF THE INVENTION

The present invention relates to processing a bio-sourced oil to provide a bio-sourced oil dielectric fluid.

BACKGROUND OF THE INVENTION

Dielectric (or insulating) fluids used in electrical distribution and power equipment—including transformers, switching gear and electric cables—perform two important functions. These fluids act as an electrical insulating medium, i.e., exhibit dielectric strength, and they transport generated heat away from the equipment, i.e., act as a cooling medium. When used in a transformer, for example, dielectric fluids transport heat from the windings and core of the transformer or connected circuits to cooling surfaces. Apart from possessing dielectric strength and cooling capacity, an ideal dielectric fluid for electrical equipment also exhibits little or no detrimental impact on the environment, is compatible with materials used to construct the equipment, and is relatively nonflammable.

There are a number of specific functional properties characteristic of dielectric oils. An oil's dielectric breakdown, or dielectric strength, provides an indication of its ability to resist electrical breakdown and is measured as the minimum voltage required to cause arcing between two electrodes at a specified gap submerged in the oil. The impulse dielectric breakdown voltage provides an indication of an oil's ability to resist electrical breakdown under transient voltage stresses such as lightning and power surges. The dissipation factor of an oil is a measure of the dielectric losses in the oil; a low dissipation factor indicates low dielectric loss and a low concentration of soluble, polar contaminants. The gassing tendency of an oil measures the oil's tendency to evolve or absorb gas under conditions where partial discharge is present. Likewise, stray gassing may occur as the result of thermal stress of dielectric oils (such as transformer oils), resulting in the release of hydrogen, methane, ethane, ethylene, etc.

Because one function of a dielectric fluid is to carry and dissipate heat, factors that significantly affect the relative ability of the fluid to function as a dielectric coolant include viscosity, specific heat, thermal conductivity, cold temperature properties, and the coefficient of expansion. The values of these properties, particularly in the range of operating temperatures for the equipment at full rating, must be weighed in the selection of suitable dielectric fluids for specific applications.

In addition to the foregoing properties that affect heat transfer, a dielectric fluid should have a relatively high dielectric strength, low dissipation factor, a dielectric constant that is compatible with the solid dielectric, a low gassing tendency, and it must be compatible with the electrical equipment materials to which it is exposed. Control of stray gassing prevents buildup of explosive gases in the head space of electrical equipment.

A dielectric fluid for use in electrical equipment comprising a vegetable oil or vegetable oil blend and comprising one or more antioxidant compounds is described in U.S. Pat. No. 7,651,641 to Corkran, et al.

US Patent Publication No. 2018/0294068 describes methods for insulating and cooling a transformer using enzymatically-degummed vegetable oils, and methods for adding an enzymatically-degummed vegetable oil to an enclosure of an electrical device. This application also discloses processes for making dielectric fluids using enzyme-degumming of vegetable oils or using enzyme-degummed vegetable oils as the starting material for the process.

SUMMARY OF THE INVENTION

Mobile systems have been developed for conditioning, or in particular reconditioning mineral oils for use as dielectric fluids in transformers. These systems provide the ability to recondition mineral oil on site at the transformer, thereby avoiding transport of the mineral oil from a use site to a central processing facility and back again.

For example, systems for conditioning transformer oils are described, such as model SES320(R)-3000 Insulating Oil Purifier by Sesco, Inc. at https://www.sesco-inc.com/37-products/transformer-service-equipment/insulating-oil-purifiers/ses320-insulating-oil-conditinoing/ses320-r/90-ses320-3000.html. These systems are designed for single pass conditioning of new and in service (Group I & II) insulating fluids, increasing voltage values (dielectric strength) by removing dissolved water, dissolved gas, oxidation byproducts, and solid matter contamination. This model is described to also be useful for "natural ester fluids" when the process specification are adapted by de-rating the flow capacity of the system by 25% when processing Natural or Synthetic Ester Dielectric Fluids, with an additional recommendation of carrying out at least two passes of the fluid through the system.

Similarly, transformer oil purification systems have been sold by Enervac international ULC as described at http://www.enervac.com/transformer-oil-purification-systems. For example, the E865A product is described as carrying out a high vacuum process for the dehydration and degasification of electrical insulating liquids including transformer oils, polybutene and silicone fluids, to increase and maintain their dielectric strength. The processing includes the removal of free and soluble water, dissolved air and gases and particulate matter.

An apparatus for drying and degassing oil is described in U.S. Pat. No. 4,121,352. The apparatus comprises a treatment tank; an oil circulation circuit including a pumping set, heating means, and spraying means; and a vacuum pump for bringing the oil in the tank under partial vacuum. The apparatus is shown arranged on a wheeled carriage.

A typical process design for a prior art mobile system 100 for reconditioning mineral oils, in contrast with the present system for processing a bio-sourced oil to provide a bio-sourced oil dielectric fluid, is shown in FIG. 1 as a schematic process flow diagram. In this system, spent mineral oil is provided in mineral oil source tank 110. The mineral oil is pumped out of the mineral oil source tank 110 by pump 120, and for example is heated to a temperature of about 60° C. by heater 130. The mineral oils can for example be pumped through mobile system 100 at a flow rate of about 9000 l/hr (9 M3/H). The heated oil is then filtered through absorbent media, e.g. clay filters 140 that decolorize and/or remove polar and/or acidic components from the oil. The oil then flows through paper filters 150 to capture particles that may escape from the clay filters. The oil is then degassed in a degasser/vacuum system array 160 comprising degasser 162 and vacuum system 164. The degassed oil then passes through a final paper polishing filter 170 prior to delivery to finished product tank 180. Because mineral oil is non-polar, it is relatively easy to process as compared to bio-sourced oils. Thus, spent mineral oil may generally be decolorized and acidic material may be removed therefrom in one pass of conventional filtration equipment. Because it is relatively easy to remove water and other polar species from mineral oil, inexpensive paper filters can be used in post clay treatment steps, since the paper will not deform or stretch from exposure to polar species and water. Additionally, mineral oil exhibits relatively low viscosity, and does not retain fines that tend to damage downstream filtration media. Additionally, it is noted that care must be exercised when heating mineral oil. If mineral oil is heated to too high a temperature, the mineral oil will be adversely affected and some components may be volatilized and removed in the degassing step.

In contrast, bio-sourced oil based fluids are much more difficult to process as compared to mineral oils, particularly when the bio-sourced oil based fluids are to be processed in a mobile system environment that is limited in space for equipment and power available to conduct the processing. Persons familiar with steps and systems for reprocessing mineral oil and synthetic esters in mobile system environments are not aware of the issues that can complicate the production of bio-sourced oil based dielectric fluids. As a first issue, bio-sourced oils comprise more polar functionality than mineral oil. A major challenge in processing a bio-sourced oil to provide a bio-sourced oil dielectric fluid is that bio-sourced oil contains or easily takes up water. As noted above, bio-sourced oil based dielectric fluids (such as vegetable oils) are polar, and therefore are more likely to carry undesired polar impurities (such as moisture, contaminants, or oxidation by-products) than mineral oil. The impurities in bio-sourced oil are likely to not be captured in conventional filtering equipment and under processing conditions typically used for mineral oil. Furthermore, the bio-sourced oils can strip additional water from the treatment clays. This can cause unforeseen problems in both production and use of bio-sourced oil based dielectric fluids, such as swelling and weakening of filter paper and increasing degassing time.

Additionally, bio-sourced oils contain polar impurities that are not generally present in mineral oils. These polar impurities are challenging to remove from the desired bio-sourced oils. Examples of such polar impurities include the impurities from the oil refining process, such as phospholipids and components formed by the breakdown of triacylglycerides, such as monoacylglycerides, diacylglycerides, aldehydes, ketones, acids, soaps, and the like. The presence of water and such polar impurities are problematic for use of bio-sourced oils as dielectric fluids, and proper and economic processing of bio-sourced oils for use as dielectric fluids is challenging.

It has been discovered that bio-sourced oil based dielectric fluids may be efficiently and effectively processed in a mobile setting if the design of the mobile system is different from that of a system configured for reprocessing of mineral oil or synthetic esters.

Moreover, it has been discovered that methods for production of bio-sourced oil based dielectric fluids using a mobile apparatus as described herein afford particular advantage in providing benefits in certain applications and markets. As smaller, less industrialized countries increase their industrial segment growth, the use of relatively small and/or more geographically separated equipment that uses dielectric fluid is required. An increased demand for smaller quantities of dielectric fluid for use at diverse worksites is created both by increase in development of local industries and is satellite production networks by international companies. Additionally, the economics and import duties of developing countries do not offer a price structure to support long term importation of fluids, and often, governments require the use of locally produced oils to support growth in their economic zone. To produce under the umbrella of local production, it is usually not cost effective to build a large production facility for producing dielectric fluids for transformers. The mobile apparatus as described herein can be made at a cost that fits the economics of the market, and can be co-located at facilities using dielectric fluids to provide on site processing, thereby enabling "on demand" delivery of product at a reasonable price. In an aspect, a plurality of the mobile apparatus as described herein is distributed within a region co-located at or near facilities using dielectric fluids to provide on site processing, thereby providing a network of bio-sourced oil processing capacity for local, "on demand" delivery of product.

Methods and mobile apparatus for processing bio-sourced oil are described for producing bio-sourced oil dielectric fluids to allow a low capitalization for market entry into newly developing markets by processing bio-sourced oil fluids (i.e., vegetable oils) into a highly purified base oil that is then formulated and processed to provide a dielectric fluid composition to the specifications required for performance in an electrical apparatus.

In an aspect, a method for processing a bio-sourced oil to provide a bio-sourced oil dielectric fluid comprises:

Providing a bio-sourced oil starting material;

Heating the bio-sourced oil to a temperature of at least about 60°;

Circulating the heated bio-sourced oil through an adsorbent media array composed of a clay media in an adsorbent media column, wherein the adsorbent media removes polar impurities from the bio-sourced oil;

Circulating the heated oil through one or more filter arrays, wherein the filter arrays in aggregate retain particles of 0.5 micron or larger with a beta rating of at least 200;

Circulating the heated oil through a degasser and vacuum system array;

Adding additives in liquid form comprising antioxidants, optional pour-point depressants, and optional colorant to the bio-sourced oil by use of an additive metering/mixing valve system to provide a bio-sourced oil dielectric fluid; and Collecting the bio-sourced oil dielectric fluid;

Wherein:

i) the bio-sourced oil is maintained at a temperature of at least about 60° C. ° throughout the method, ii) the mobile apparatus is configured so that the pressure differential of the bio-sourced oil when it is flowing through the adsorbent media array or the one or more filter arrays is not greater than about 300 kPa, iii) the mobile apparatus is configured so that is capable of being operated on an electrical supply of from about 100 kW to about 2000 kW of power, and iv) the mobile apparatus is mounted on a mobile transport platform system having a total footprint of no more than about 30 $m^2$; and Wherein the bio-sourced oil dielectric fluid exhibits:

(a) a Dielectric Dissipation Factor of about 0.2% or less at 25° C., (b) an Acid Value (AV) of less than about 0.06 milligrams KOH/gram oil, (c) a moisture content of about 25 ppm or less, and (d) a Pour Point of less than about −5° C.

In an aspect, a mobile apparatus for processing a bio-sourced oil to provide a bio-sourced oil dielectric fluid comprises:

a pump and heater array, an adsorbent media array, wherein the adsorbent media removes polar impurities from bio-sourced oil, one or more filter arrays downstream from the adsorbent media array, wherein the filter arrays in aggregate retain particles of 0.5 micron or larger with a beta rating of at least 200;

a degasser and vacuum system array;

an additive metering/mixing valve system;

and a plumbing system fluidly interconnecting the pump and heater array, the adsorbent media array, the one or more filter arrays, the degasser and vacuum system array, and the additive metering/mixing valve system;

Wherein:

i) the mobile apparatus is configured with controls to maintain bio-sourced oil at a temperature of at least about 60° throughout a method carried out in the apparatus, ii) the mobile apparatus is configured with controls to prevent exposure of bio-sourced oil to a pressure differential greater than 300 kPa throughout a method carried out in the apparatus, iii) the mobile apparatus is configured with controls enabling the mobile apparatus to be operated on an electrical supply of from about 100 kW to about 2000 kW of power, and iv) the pump and heater array, the adsorbent media array, the one or more filter arrays, the degasser and vacuum system array, the additive metering/mixing valve system, and the plumbing system are mounted on a mobile transport platform system having a total footprint of no more than about 30 $m^2$.

The mobile apparatus as described herein is particular advantageous as providing a specialized production facility that does not require the capital investment of building a full scale manufacturing plant. The needs of providing high quality, low cost, locally sourced dielectric fluids can be economically satisfied by assembly of the present mobile apparatus on a production scale in a controlled manufacturing facility, such as a manufacturing plant. The mobile apparatus itself can be prepared using standard procedures and equipment to provide a turn-key mobile apparatus that can operate as a production facility ready for use anywhere in the world. The mobile apparatus is mobile in the sense that it can be readily transported from the location of assembly to the site of use. In an aspect, the mobile apparatus may permanently stay at its first site of use. In an aspect, the mobile apparatus may move from one site to another multiple times during its time of operation.

BRIEF DESCRIPTION OF THE DRAWINGS

The accompanying drawings, which are incorporated in and constitute a part of this application, illustrate several aspects of the invention and together with a description of the embodiments serve to explain the principles of the invention. In the drawings, like reference numbers represent like parts. A brief description of the drawings is as follows.

DETAILED DESCRIPTION

Figure 1:
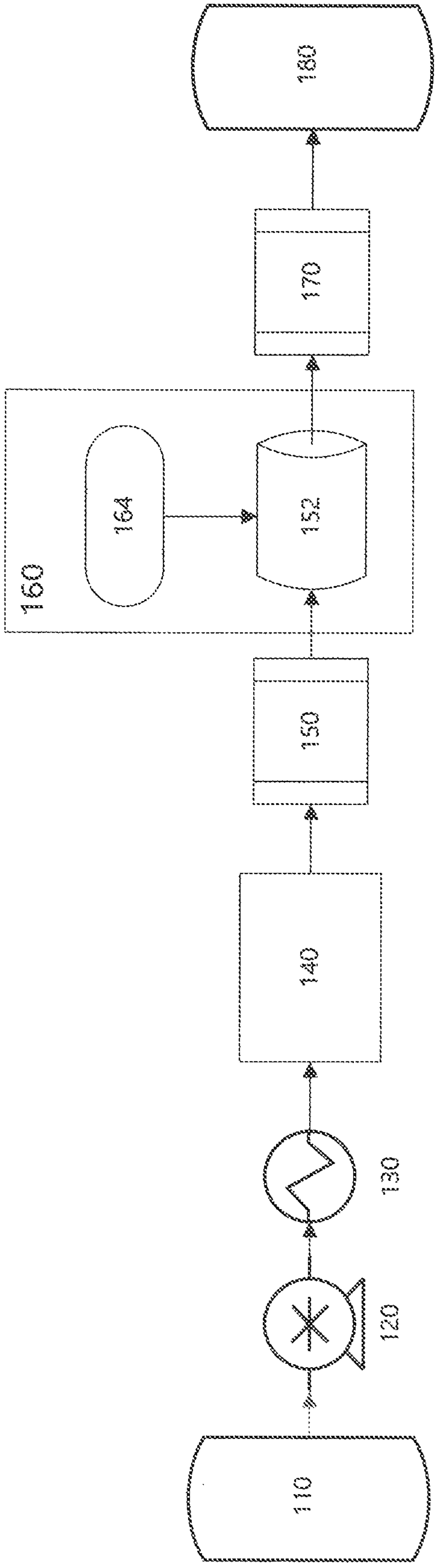
FIG 1 Prior Art
FIG. 1 is a schematic process flow diagram of an example of a prior art mobile system for reconditioning mineral oils.

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

The suitability of bio-sourced oil dielectric fluid for use in electrical devices may be determined by quantitative testing, such as by the Dielectric Dissipation Factor (DDF) test. Other tests, for example, the Interfacial Tension of Oil Against Water by the Ring Method test ("IFT") and the DDF test can indicate the presence of small amounts of soluble polar, molecular contaminants that may be undesirable in electrical devices and may cause deterioration of the electrical performance of the dielectric fluid in an electrical device. It will be understood that the other such tests may be used as a surrogate for the DDF tests while carrying out the present method in the field as convenient, to show that the material being processed meets suitability standards as would be indicated by the DDF test as described herein.

The Dielectric Dissipation Factor is a measure for dielectric losses caused by the liquid, and is determined in accordance with ASTM D924-08 at 25° C., wherein the test is carried out using an average voltage gradient of 500 volts/mil and a frequency of applied voltage of 60 Hz. High Dielectric Dissipation Factor values can indicate contamination of the liquid with moisture, particles or soluble polar contaminants or poor refining quality.

Bio-sourced oils are particularly desirable for preparation of the present dielectric fluid, because they are derived from renewable resources and are generally readily biodegradable. In an aspect, bio-sourced oils have the additional property of increasing paper stability in transformer applications. Bio-sourced oils bring the benefit of high flash and fire point properties, low ignitability, and low fire propagation unlike mineral oils. The flash, fire point, and ignitability of synthetic esters are highly dependent upon composition. Bio-sourced oils comprising unsaturation provide beneficial flow properties, with decreasing viscosity of the oil correlating to increased unsaturation.

In an aspect, the oil is a natural bio-sourced oil, meaning that it comprises triacyl glyceride obtained from a vegetable or animal source that has not been modified by reactive chemistry, for example, by transesterification or formation of oil derivative products. For clarity, it is understood that a vegetable or animal oil that is modified by interesterification (i.e., redistribution of the fatty acid moieties present in a triglyceride oil over its glycerol moieties) is considered to be a natural bio-sourced oil. Additionally, it is understood that a vegetable or animal oil that is obtained by extraction is considered to be a natural bio-sourced oil.

In an aspect, the oil used in preparation of the dielectric fluid is a vegetable oil. In an aspect, the dielectric fluid comprises a vegetable oil, selected from the group consisting of castor, coconut, corn, cottonseed, crambie, flaxseed, jojoba, kukui nut, lesquerella, linseed, olive, palm, peanut, pine nut, rapeseed, safflower, sunflower, soybean, and veronica oil, and mixtures thereof. In an aspect, the only oil in the dielectric fluid is a vegetable oil. In an aspect, the only oil in the dielectric fluid is a vegetable oil selected from the group consisting of castor, coconut, corn, cottonseed, crambie, flaxseed, jojoba, kukui nut, lesquerella, linseed, olive, palm, peanut, pine nut, rapeseed, safflower, sunflower, soybean, and veronica oil, and mixtures thereof.

In an aspect, the vegetable oil is selected from soybean oil and Rapeseed oil.

In an aspect, the bio-sourced oil is obtained from microbes, seaweed and like organic sources.

In an aspect, raw bio-sourced oil may be provided for use as the bio-sourced oil starting material that is has an unacceptably high Acid Value that in an aspect may be reduced before the bio-sourced oil is used as a bio-sourced oil starting material. For example, the raw bio-sourced oil may have an Acid Value of from about 5 to about 0.1 milligrams KOH/gram oil, or from about 3 to about 0.01 milligrams KOH/gram oil, or from about 1 to about 0.01 milligrams KOH/gram oil. The Acid Value of the bio-sourced oil starting material advantageously may be reduced before processing in the present mobile apparatus by any appropriate pretreatment before being used as a bio-sourced oil starting material, i.e. before being processed in the present apparatus. In an aspect, the raw bio-sourced oil is pre-treated by a deodorizing treatment before being used as a bio-sourced oil starting material. In an aspect, the raw bio-sourced oil is pre-treated with an adsorbent comprising magnesium silicate to reduce Acid Value before being used as a bio-sourced oil starting material. Examples of commercially available filter aids that can be used for this purpose include Britesorb™, Hubersorb™ Frypowder™ and Magnesol™. In an aspect, the Acid Value of the raw bio-sourced oil is reduced prior to introduction into the mobile apparatus to provide a bio-sourced oil starting material having an Acid Value that is close to or that is within the range of the desired Acid Value for use as a dielectric fluid. If the Acid Value is close to the range of the desired Acid Value for use as a dielectric fluid, the Acid Value of the bio-sourced oil can be further reduced during processing in the present mobile apparatus to a desired Acid Value level. In an aspect, the Acid Value of the raw bio-sourced oil is reduced prior to introduction into the mobile apparatus as presently described to provide a bio-sourced oil starting material having an Acid Value of from about 2 to about 0.01 milligrams KOH/gram oil. In an aspect, bio-sourced oil starting material has an Acid Value of from about 1 to about 0.01 milligrams KOH/gram oil. In an aspect, bio-sourced oil starting material has an Acid Value of from about 0.5 to about 0.01 milligrams KOH/gram oil.

In an aspect, the bio-sourced oil starting material has an Acid Value about 0.09 milligrams KOH/gram oil or less. In an aspect, the bio-sourced oil starting material has an Acid Value of about 0.6 milligrams KOH/gram oil or less. In an aspect, the bio-sourced oil starting material has an Acid Value of from about 0.09 to about 0.005 milligrams KOH/gram oil. In an aspect, the bio-sourced oil starting material has an Acid Value of from about 0.09 to about 0.01 milligrams KOH/gram oil. In an aspect, the bio-sourced oil starting material has an Acid Value of from about 0.06 to about 0.005 milligrams KOH/gram oil. In an aspect, the bio-sourced oil starting material has an Acid Value of from about 0.06 to about 0.001 milligrams KOH/gram oil.

Raw bio-sourced oil provided for use as the bio-sourced oil starting material typically has a water content that is higher than suitable mineral oil dielectric fluids. The water content of raw bio-sourced oil is typically not reduced before use as a bio-sourced oil starting material. In an aspect, the bio-sourced oil starting material has an initial moisture content of over about 100 ppm. In an aspect, the bio-sourced oil starting material has an initial moisture content of from about 100 ppm to about 400 ppm.

In an aspect, raw bio-sourced oil may be provided for use as the bio-sourced oil starting material that has an unacceptably high Dielectric Dissipation Factor. In an aspect, the Dielectric Dissipation Factor of the raw bio-sourced oil is reduced before use as a bio-sourced oil starting material. The Dielectric Dissipation Factor of the raw bio-sourced oil advantageously may be reduced before processing in the present apparatus by pretreatment before processing in the present apparatus. It has been found that pretreatment of the raw bio-sourced oil to reduce the initial Dielectric Dissipation Factor before processing in the present apparatus is advantageous, because such pretreatment can substantially increase the service life of the adsorbent media in the apparatus.

In an aspect, the raw bio-sourced oil is pre-treated with an adsorbent media that removes polar impurities from the bio-sourced oil to reduce the Dielectric Dissipation Factor use as a bio-sourced oil starting material. In an aspect, the raw bio-sourced oil may have a Dielectric Dissipation Factor of from about 1 to 10% at 25° C. that in an aspect is reduced before introduction into the apparatus as presently described as a bio-sourced oil starting material. In an aspect, the raw bio-sourced oil may have a Dielectric Dissipation Factor of from about 2 to 10% at 25° C. that in an aspect is reduced before introduction into the apparatus as presently described as a bio-sourced oil starting material. In an aspect, the raw bio-sourced oil may have a Dielectric Dissipation Factor of from about 3 to 10% at 25° C. that in an aspect is reduced before introduction into the apparatus as presently described as a bio-sourced oil starting material.

In an aspect, the bio-sourced oil starting material has a Dielectric Dissipation Factor of at least 0.5% at 25° C. In an aspect, the bio-sourced oil starting material has a Dielectric Dissipation Factor of at least 0.7% at 25° C. In an aspect, the bio-sourced oil starting material has a Dielectric Dissipation Factor of at least 0.8% at 25° C. In an aspect, the bio-sourced oil starting material has a Dielectric Dissipation Factor of at least 0.9% at 25° C. In an aspect, the bio-sourced oil starting material has a Dielectric Dissipation Factor of at least 1% at 25° C.

In an aspect, the bio-sourced oil starting material has a Dielectric Dissipation Factor of from about 0.5% to about 3% at 25° C. In an aspect, the bio-sourced oil starting material has a Dielectric Dissipation Factor of from about 0.5% to about 2% at 25° C. In an aspect, the bio-sourced oil starting material has a Dielectric Dissipation Factor of from about 0.5% to about 1.5% at 25° C. In an aspect, the bio-sourced oil starting material has a Dielectric Dissipation Factor of from about 0.5% to about 0.8% at 25° C. In an aspect, the bio-sourced oil starting material has a Dielectric Dissipation Factor of from about 0.08% to about 0.5% at 25° C. In an aspect, the bio-sourced oil starting material has a Dielectric Dissipation Factor of from about 0.08% to about 0.4% at 25° C. In an aspect, the bio-sourced oil starting material has a Dielectric Dissipation Factor of from about 0.08% to about 0.3% at 25° C. In an aspect, the bio-sourced oil starting material has a Dielectric Dissipation Factor of from about 0.08% to about 0.2% at 25° C. In an aspect, the bio-sourced oil starting material has a Dielectric Dissipation Factor of from about 0.1% to about 1% at 25° C.

The bio-sourced oil starting material is heated to a temperature of above about 60° C. using any appropriate heating system, such as a heat exchanger. In an aspect, the bio-sourced oil starting material is heated to a temperature of from about 60° C. to about 80° C. using any appropriate heating system, such as a heat exchanger. In an aspect, the temperature of the bio-sourced oil is maintained at a temperature of above about 60° C. throughout the method (i.e. from after the initial heating step through the optional circulation of the heated oil through a polishing filter). In an aspect, the temperature of the bio-sourced oil is maintained at a temperature of from about 60° C. to about 80° C. throughout the method (i.e. from after the initial heating step through the optional circulation of the heated oil through a polishing filter).

The bio-sourced oil is pumped by one or more suitable pumps located at appropriate locations in the apparatus to circulate the bio-sourced oil at flow rate and oil pressures, such as the locations discussed herein.

The heated bio-sourced oil is circulated through at least one adsorbent media array, wherein the adsorbent media in the adsorbent media array removes polar impurities from the bio-sourced oil to obtain a bio-sourced oil dielectric fluid having the desired Dielectric Dissipation Factor. Advantageously, the adsorbent media arrays as described herein are space efficient and effectively remove polar impurities under relatively low pressure conditions. This is in contrast to oil treatment methods typically used in large scale plant conditions, where large, heavy industrial equipment, (such as filter presses that operate at high pressures) are used to conduct certain filtration steps.

In an aspect, the heated bio-sourced oil is circulated through an adsorbent media array selected to reduce polar components present in the bio-sourced oil such that the final bio-sourced oil dielectric fluid exhibits a desired Dielectric Dissipation Factor.

In an aspect, the bio-sourced oil dielectric fluid has a Dielectric Dissipation Factor of about 0.20% or less at 25° C. In an aspect, the bio-sourced oil dielectric fluid has a Dielectric Dissipation Factor of about 0.18% or less at 25° C. In an aspect, the bio-sourced oil dielectric fluid has a Dielectric Dissipation Factor of about 0.12% or less at 25° C. In an aspect, the bio-sourced oil dielectric fluid has a Dielectric Dissipation Factor of about 0.1% or less at 25° C. In an aspect, the bio-sourced oil dielectric fluid has a Dielectric Dissipation Factor of about 0.09% or less at 25° C. In an aspect, the bio-sourced oil dielectric fluid has a Dielectric Dissipation Factor of about 0.08% or less at 25° C.

In an aspect, the bio-sourced oil dielectric fluid has a Dielectric Dissipation Factor of from 0.005 to 0.2% at 25° C. In an aspect, the bio-sourced oil dielectric fluid has a Dielectric Dissipation Factor of from 0.005 to 0.18% at 25° C. In an aspect, the bio-sourced oil dielectric fluid has a Dielectric Dissipation Factor of from 0.005 to 0.15% at 25° C. In an aspect, the bio-sourced oil dielectric fluid has a Dielectric Dissipation Factor of from 0.005 to 0.12% at 25° C. In an aspect, the bio-sourced oil dielectric fluid has a Dielectric Dissipation Factor of from 0.01 to 0.2% at 25° C. In an aspect, the bio-sourced oil dielectric fluid has a Dielectric Dissipation Factor of from 0.01 to 0.18% at 25° C. In an aspect, the bio-sourced oil dielectric fluid has a Dielectric Dissipation Factor of from 0.01 to 0.15% at 25° C. In an aspect, the bio-sourced oil dielectric fluid has a Dielectric Dissipation Factor of from 0.01 to 0.12% at 25° C. In an aspect, the bio-sourced oil dielectric fluid has a Dielectric Dissipation Factor of from 0.03 to 0.2% at 25° C. In an aspect, the bio-sourced oil dielectric fluid has a Dielectric Dissipation Factor of from 0.03 to 0.18% at 25° C. In an aspect, the bio-sourced oil dielectric fluid has a Dielectric Dissipation Factor of from 0.03 to 0.15% at 25° C. In an aspect, the bio-sourced oil dielectric fluid has a Dielectric Dissipation Factor of from 0.03 to 0.12% at 25° C. In an aspect, the bio-sourced oil dielectric fluid has a Dielectric Dissipation Factor of from 0.05 to 0.2% at 25° C. In an aspect, the bio-sourced oil dielectric fluid has a Dielectric Dissipation Factor of from 0.05 to 0.18% at 25° C. In an aspect, the bio-sourced oil dielectric fluid has a Dielectric Dissipation Factor of from 0.05 to 0.15% at 25° C. In an aspect, the bio-sourced oil dielectric fluid has a Dielectric Dissipation Factor of from 0.05 to 0.12% at 25° C. In an aspect, the bio-sourced oil dielectric fluid has a Dielectric Dissipation Factor of from 0.07 to 0.15% at 25° C. In an aspect, the bio-sourced oil dielectric fluid has a Dielectric Dissipation Factor of from 0.08 to 0.15% at 25° C.

The adsorbent media array comprises a number of adsorbent media columns filled with adsorbent media. The adsorbent media columns are connected in parallel to facilitate a desired low flow rate in each of the individual adsorbent media columns for efficient removal of polar impurities, while maintaining a collective average flow rate to achieve acceptable productivity of the mobile apparatus. Multiple combinations or singular use of these adsorbent media columns can be utilized as needed. Various arrangements of the adsorbent filter array are described below with reference to the figures.

The adsorbent media of the adsorbent media arrays is selected from materials that remove polar impurities. In an aspect, the adsorbent media to be used in the adsorbent media array is selected for removal of polar impurities by a screening test whereby a sample of the bio-sourced oil to be processed at the location of use (e.g. soybean oil, corn oil) is loaded with 0.25% wt of the proposed solid adsorbent media and heated at 80° C. for two hours under 10 mm vacuum, and the Dielectric Dissipation Factor is measured before and after to confirm effectiveness of adsorbency of polar impurities for the expected final use specifications of the bio-sourced oil dielectric fluid.

In an aspect, the adsorbent media to be used in the adsorbent media array is selected for removal of polar impurities so that a bio-sourced oil sample having a Dielectric Dissipation Factor of 1% or less at 25° C., when loaded with 0.25% wt of the proposed solid adsorbent media and heated at 80° C. for two hours under 10 mm vacuum, has a final Dielectric Dissipation Factor of 0.2% or less at 25° C.

In an aspect, the adsorbent media comprises a clay medium selected from silicates, aluminates, and the like to remove polar impurities. In an aspect, the adsorbent media comprises clays selected from phyllosilicates. In an aspect, the adsorbent media comprises phyllosilicate clay materials selected from halloysite, kaolinite, illite, montmorillonite, vermiculite, talc, sepiolite, attapulgite, and pyrophyllite.

In an aspect, the adsorbent media comprises adsorbent media selected from attapulgite clays, bauxite clays, bentonite clays, modified silicates, aluminates, magnesium silicates, modified diatomaceous earths, fullers earths, bleaching clays, resins, other such adsorbent materials modified to remove polar impurities, and mixtures thereof.

It further has been discovered that adsorbent media, such as clay media, may be particularly susceptible to degradation over time when exposed to bio-sourced oils as compared to mineral oils. While not being bound by theory, it is believed that the more polar nature of bio-sourced oils may operate to break down adsorbent media to produce smaller fines that pass through to later operations of the method. For this reason, the adsorbent media should be chosen to have a particle size large enough to avoid generation of an adverse fines load downstream. In an aspect, the adsorbent media columns are each provided with an appropriate filtration or screen component to avoid loss of fines from the adsorbent media columns. In an aspect, the adsorbent media columns are each provided with a filtration or screen component of from about 300 to about 250 mesh. In an aspect, the adsorbent media columns are each provided with a filtration or screen component of from about 450 to about 300 mesh. In an aspect, the adsorbent media columns are each provided with a filtration or screen component of from about 625 to 450 mesh.

In an aspect, the adsorbent media column comprises solid adsorbent media having a particle size of from 30 to 90 mesh filled into cannisters fitted with a bottom retention screen. It has been found that adsorbent media conventionally used in mineral oil reconditioning systems may have a much smaller particle size, on the order of 90 to 200 mesh, and therefor require pumping a high pressure that adversely affects the process and/or performance of the final bio-sourced oil. It additionally has been found that using solid adsorbent media having a particle size larger than about 30 mesh resulting in undesirably low efficiency.

In an aspect, the adsorbent media contains magnesium silicate having a particle size between 30 to 90 mesh.

In an aspect, the adsorbent media array comprises columns containing thermally activated, granular attapulgite mineral such as Microsorb 30/60 LVM. In an aspect, the adsorbent media array comprises columns comprising activated bauxite, such as Purocel R1 PSD adsorbent.

In an aspect, the heated bio-sourced oil is additionally circulated through an adsorbent media array selected to reduce acids in the bio-sourced oil.

In an aspect, the heated bio-sourced oil is circulated through an adsorbent media array selected to reduce acids in the bio-sourced oil to an Acid Value (AV) of 0.06 milligrams KOH/gram oil or less. In an aspect, the heated bio-sourced oil is circulated through an adsorbent media array selected to reduce acids in the bio-sourced oil to an Acid Value (AV) of 0.03 milligrams KOH/gram oil or less. In an aspect, the heated bio-sourced oil is circulated through an adsorbent media array selected to reduce acids in the bio-sourced oil to an Acid Value (AV) of from about 0.06 milligrams KOH/gram oil to about 0.01 milligrams KOH/gram oil.

In an aspect, the adsorbent media to be used in the adsorbent media array is selected for reduction of Acid Value by a screening test whereby a sample of the bio-sourced oil to be processed at the location of use (e.g. soybean oil, corn oil) is loaded with 0.25% wt of the proposed solid adsorbent media and heated at 80° C. for two hours under 10 mm vacuum, and the Acid Value is measured before and after to confirm effectiveness of reduction of Acid Value for the expected final use specifications of the bio-sourced oil dielectric fluid.

In an aspect, the adsorbent media to be used in the adsorbent media array is selected for reduction of Acid Value so that a bio-sourced oil sample having an Acid Value of from about 0.08 KOH/gram oil, when loaded with 0.25% wt of the proposed solid adsorbent media and heated at 80° C. for two hours under 10 mm vacuum, has a final Acid Value (AV) of 0.06 milligrams KOH/gram oil or less.

In an aspect, the mobile apparatus is provided with a plurality of adsorbent media arrays in series, with a first adsorbent media array comprising media selected for reducing Acid Value and a second adsorbent media array comprising media selected for removing polar impurities.

In an aspect, it has been found that certain adsorbent media to be used in media arrays as described herein are effective in removing both polar impurities and reducing Acid Value in bio-sourced oil. Such media can be identified by running both the polar impurities adsorbency screening test and the Acid Value reduction screening test as discussed above.

In an aspect, the mobile apparatus is provided with a single set of adsorbent media arrays, wherein the adsorbent media array comprises media selected for reducing Acid Value and for removing polar impurities.

In an aspect, it has been found that adsorbent media comprising magnesium silicate can be effective in both reducing Dielectric Dissipation Factor and Acid Value of a bio-sourced oil.

It has been found to be advantageous to carry out the present method so that the pressure differential of the bio-sourced oil when it is flowing through the mobile apparatus is not greater than about 300 kPa. In an aspect, the present method is carried out so that the pressure differential of the bio-sourced oil when it is flowing through the adsorbent media array or any of the filter arrays is from about 100 kPa to about 300 kPa. In an aspect, the present method is carried out so that the pressure differential of the bio-sourced oil when it is flowing through the adsorbent media array or any of the filter arrays is from about 100 kPa to about 250 kPa. The pressure differential of the bio-sourced oil can be different at different components of the mobile apparatus, depending on the relative position of any given component from a pump, and the operation of the given component or components upstream from a given component.

It has been found that operating at too low a pressure reduces productivity of the mobile system, and operating at too high a pressure potentially causes damage to the adsorbent media array or any of the filter arrays. Additionally, it has been found that high pressure differentials causes processing and potential quality issues in the resulting bio-sourced oil dielectric fluid.

It has been found to be advantageous to carry out the present method so that the flow rates of the bio-sourced oil through the adsorbent media array and filters used in the present methods are relatively low for effective scouring and filtering of polar components from the bio-sourced oil. This beneficial effect is much more pronounced when treating bio-sourced oil as compared to mineral oil.

In an aspect, it has been found to be advantageous to carry out the present method so that the flow rate of the bio-sourced oil through the adsorbent media array is not greater than about 10 cubic meters per hour per square meter of media (M3/H/M2). It has been found that processing of the bio-sourced oil through the adsorbent media array at a flow rate of greater than about 10 M3/H/M2 may lead to adverse pressure discharge and acetylene generation. In an aspect, the present method is carried out so that the flow rate of the bio-sourced oil through the adsorbent media array is from about 3 to about 10 M3/H/M2. In an aspect, the present method is carried out so that the flow rate of the bio-sourced oil through the adsorbent media array is from about 6 to about 10 M3/H/M2.

In an aspect, the adsorbent media array and filters used in the present methods are monitored for filtration effectiveness and rotated out of service and replenished as needed.

After the heated bio-sourced oil is circulated through an adsorbent media array, the oil is circulated through a one or more filter arrays to remove fines from the bio-sourced oil. The polar, higher viscosity, bio-sourced oil has been found to carry a large fines load to the filter array, requiring a filter to remove the fines load from the system prior to secondary processing through the degasser to remove the excess water introduced into the system. Paper filters typically used for mineral oils will stretch and permit fines to pass through to the downstream process where they will cause blockages and adversely affect the properties of the bio-sourced oil transformer fluid.

Additionally, it has been found that filters typically used in prior art mineral oil reconditioning processes are not effective in capturing the fines that are generated in a process from obtaining a bio-sourced oil dielectric fluid. While not being bound by theory, it is believed that bio-sourced oils retain a higher amount of water and polar components that adversely affect the agglomeration of the adsorbent media (e.g., the clay) and generate very small fines that escape and damage or are not captured by conventional filters used in mineral oil processes. In the alternative or additionally, it is believed that the polar nature of the bio-sourced oil itself would adversely affect the performance of the conventional filters used in mineral oil processes, if the use of such conventional filters were attempted in the present method.

In an aspect, the filters used in the present mobile apparatus are selected to exhibit no loss of particle retention or beta rating performance through distortion or filter material degradation in a screening test where the filter is exposed to a flow of water through the filter at a pressure differential of 300 kPa for a time of 4 hours at a temperature of 80° C. A typical failure mode of filters under this screening test is swelling of the filter media, creating large pores or voids, or distortion of the filter structure.

In an aspect, the filters used in the present mobile apparatus comprise non-water-swelling filter media. In an aspect, the filter media comprises a material selected from polypropylene, HDPE, and the like.

In an aspect, a plurality of filter arrays located downstream from the adsorbent media array are used to retain particles in a stepwise fashion, wherein a first filter array is sized to retain larger particles and a second filter array is sized to retain smaller particles. The last filter array in the mobile apparatus is selected to retain particles at the maximum particle size to be permitted in the bio-sourced oil dielectric fluid.

In an aspect, the filters of the first filter array are selected to retain particles of 10 microns or larger. In an aspect, the filters of the first filter array are selected to retain particles of 5 microns or larger. In an aspect, the filters of the first filter array have a beta rating of at least 200. In an aspect, the filters of the first filter array have a beta rating of at least 500. In an aspect, the filters of the first filter array have a beta rating of at least 800. In an aspect, the filters of the first filter array have a beta rating of at least 1000.

After the oil is circulated through the first filter array, the oil is optionally circulated through a second filter array in the event that the desired specifications of impurity and/or particle removal are not achieved in the circulation of the oil through the first filter array.

In an aspect, the filters of the second filter array are selected to retain particles of 5 microns or larger. In an aspect, the filters of the second filter array are selected to retain particles of 1 micron or larger. In an aspect, the filters of the second filter array are selected to retain particles of 0.5 micron or larger. In an aspect, the filters of the second filter array have a beta rating of at least 800. In an aspect, the filters of the second filter array have a beta rating of at least 1000. It has been found that the use of filters having a beta rating of at least about 800 provide superior protection to the degasser from particulate fouling.

In an aspect, the flow rate of the bio-sourced oil through any filter array of the method is not greater than about 100 M3/H/M2. In an aspect, the present method is carried out so that the flow rate of the bio-sourced oil through any filter array of the method is from about 30 to about 100 M3/H/M2. In an aspect, the present method is carried out so that the flow rate of the bio-sourced oil through any filter array of the method is from about 60 to about 100 M3/H/M2. The filters used in the present method and apparatus are in contrast to filters used in the processing of mineral oil, in which filters have been used having a nominal filter pore size of 75 micron.

As indicated above, the bio-sourced oil is heated to a temperature of at least about 60° as it passes through the adsorbent media array and all of the filter arrays, which is advantageous for reducing the viscosity of the oil during filtration and thereby enhancing filtration efficiency. In an aspect, the bio-sourced oil is heated to a temperature of from about 60° to about 80° C. as it passes through the adsorbent media array and all of the filter arrays. Limiting the temperature of the bio-sourced oil to a temperature of 80° C. or less is advantageous when the adsorbent media array and the filter arrays are prepared using materials that are adversely affected by higher temperatures. In an aspect, the bio-sourced oil may be heated to a temperature of 80° C. when the adsorbent media array and the filter arrays are prepared using high temperature tolerant materials, such as sintered metal filters and non-plastic vessels.

In an aspect, the bio-sourced oil is maintained at a temperature of from about 60° to about 80° C. throughout the method.

In an aspect, the Kinematic Viscosity of the bio-sourced oil as it passes through the filter arrays is from about 1 to 50 $mm^2/s$ at 60° C. In an aspect, the Kinematic Viscosity of the bio-sourced oil as it passes through the filter arrays is from about 1 to 35 $mm^2/s$ at 60° C. In an aspect, the Kinematic Viscosity of the bio-sourced oil as it passes through the filter arrays is from about 1 to 20 $mm^2/s$ at 60° C. In an aspect, the Kinematic Viscosity of the bio-sourced oil as it passes through the filter arrays is from about 1 to 50 $mm^2/s$ at 60° C.

The heated oil is then circulated through a degasser and vacuum system array comprising a vacuum system that generates a vacuum adequate for degassing the fluid and removing moisture and dissolved gasses from the bio-sourced oil. In an aspect, the bio-sourced oil starting material has an initial moisture content of over 100 ppm, or the bio-sourced oil starting material has an initial moisture content of from 100 ppm to 400 ppm. The presence of high levels of water in the bio-sourced oil starting material can be effectively managed and removed by repeated cycling of the bio-sourced oil through the degasser and vacuum system array if necessary. Recycling of bio-sourced oil through the degasser and vacuum system array has been found to extend processing time, but is not detrimental to the ultimate outcome of the method. It is noted that adsorbent medias that have not been conditioned may contain water taken up, for example, from the atmosphere. As the bio-sourced oil is processed through such adsorbent media, water will be eluted by the oil, potentially requiring additional recycling of bio-sourced oil through the degasser and vacuum system array upon system start-up.

In an aspect, the bio-sourced oil is heated to a temperature of about 70° C. or greater prior to circulation through the degasser and vacuum system array. In an aspect, the degasser and vacuum system array is configured to apply a vacuum of less than about 15 mmHg, and the degasser is configured to have a surface area sufficient to preferably designed to reduce the water present in the bio-sourced oil to about 40 ppm or less within three passes or less through the degasser and vacuum system array. In an aspect, the degasser and vacuum system array is configured to apply a vacuum of less than about 15 mmHg, and the degasser is configured to have a surface area sufficient to preferably designed to reduce the water present in the bio-sourced oil to about 25 ppm or less within three passes or less through the degasser and vacuum system array. In an aspect, the degasser and vacuum system array is configured to apply a vacuum of less than about 12 mmHg. In an aspect, the degasser and vacuum system array is configured to apply a vacuum of less than about 10 mmHg. In an aspect, the degasser has a surface area of from about 8 to about 25 $m^2$. In an aspect, the degasser has a surface area of from about 10 to about 20 $m^2$. In an aspect, the degasser has a surface area of from about 12 to about 18 $m^2$.

It should be noted that mineral oil cannot be degassed at the temperatures required in the present method, because of the relatively low boiling point of mineral oil.

In an aspect, the pressure differential of the bio-sourced oil while in the degasser and vacuum system array is typically about 100 kPa.

As noted above, the bio-sourced oil starting material typically has an initial moisture content of over 100 ppm, or in an aspect the bio-sourced oil has an initial moisture content of from 100 ppm to 400 ppm. In an aspect, the degasser and vacuum system array reduces the moisture content of the bio-sourced oil starting material from over 100 ppm to a bio-sourced oil dielectric fluid moisture content of about 40 ppm or below. In an aspect, the degasser and vacuum system array reduces the moisture content of the bio-sourced oil starting material from over 100 ppm to a bio-sourced oil dielectric fluid moisture content of about 25 ppm or below. In an aspect, the degasser and vacuum system array reduces the moisture content of the bio-sourced oil starting material from 100 ppm to 400 ppm to a bio-sourced oil dielectric fluid moisture content of about 25 ppm or below. In an aspect, a low final moisture content is achieved by a plurality of passes of the bio-sourced oil through the degasser and vacuum system array, either by a direct recirculation through the degasser and vacuum system array or by recirculation through the apparatus starting at any component upstream from the degasser and vacuum system array, such as the pump and heater array, the adsorbent media array, the first filter array, or the second filter array.

At least one characteristic of the bio-sourced oil is tested after the bio-sourced oil is treated in the degasser and vacuum system array in order to determine if whether the bio-sourced oil satisfies required performance specifications. In an aspect, if the bio-sourced oil does not meet required Dielectric Dissipation Factor specifications, the bio-sourced oil may be redirected through a recycle loop to the adsorbent media array and/or one or more filter arrays and the degasser and vacuum system array. Once the bio-sourced oil meets a required Dielectric Dissipation Factor specification (e.g. 0.2% at 25° C.), the bio-sourced oil may be redirected through a recycle loop to bypass the adsorbent media array recycle directly to one or more filter arrays and/or the degasser and vacuum system array. It is noted that the measured Dielectric Dissipation Factor will continue to be reduced somewhat even when the adsorbent media is bypassed by moisture removal in the degasser and vacuum system array.

In an aspect, if the bio-sourced oil does not meet required moisture content specifications after the bio-sourced oil is treated in the degasser and vacuum system array, the bio-sourced oil may be redirected through a recycle loop to the adsorbent media array and/or one or more filter arrays and the degasser and vacuum system array; or in the alternative to one or more filter arrays and the degasser and vacuum system array; or in the alternative to the degasser and vacuum system array.

After degassing, additives are added in the form of a liquid as necessary to provide a bio-sourced oil dielectric fluid meeting required performance specifications. Addition of these additives in liquid form is advantageous because it conveniently avoids the need to handle solids in the mobile apparatus, thereby greatly simplifying the method. Additionally, the additives are added in-line in the method, providing accurate and efficient addition with high control of concentrations of additives.

In an aspect, the additives are added using flow or metering valves for regulating the introduction of additives. The additives are generally metered as a concentrate solution into the bio-sourced oil. The additives can be metered into the bio-sourced oil by volume, weight, or flow rate to bring the final concentration of additives in the bio-sourced oil dielectric fluid to the proper levels.

In an aspect, the additives to be added comprise antioxidants, optional pour-point depressants, and optional colorant.

Incorporation of antioxidant additives have been found to be beneficial, because they slow down the oxidation of esters and, in turn, the formation of gels and acidity. One such antioxidant is 2,6-di-tert-butyl-p-cresol (DBPC), also known as BHT, but others are also used. Detection and measurement of defined anti-oxidant additives shall be in accordance with IEC 60666 or other suitable methods.

In an aspect, the additives may comprise phosphite additives. In an aspect, the phosphite component is present in an amount sufficient to reduce the hydrogen (H2) gassing of the dielectric fluid as determined by dissolved gas analysis (ASTM D3612-02, Method C) by at least 60% as compared to a like dielectric fluid composition that does not contain a phosphite component. In an aspect, the phosphite component is present in an amount sufficient to reduce the H2 gassing of the dielectric fluid as determined by dissolved gas analysis by at least 70% as compared to a like dielectric fluid composition that does not contain a phosphite component. In an aspect, the phosphite component is present in an amount sufficient to reduce the H2 gassing of the dielectric fluid as determined by dissolved gas analysis by at least 80% as compared to a like dielectric fluid composition that does not contain a phosphite component. Specific phosphite components to be added are described, for example in WO 2019/183214A1, the disclosure of which is incorporated herein by reference.

In an aspect, the additives may comprise a metal passivators. Incorporation of a metal passivator has been found to be useful in dielectric fluids, particularly for those comprising synthetic ester oils. While not being bound by theory, it is believed that metal passivators act to reduce the catalysis of oxidative degradation by dissolved metals and metal surfaces in the environment of use of the dielectric fluids. Additionally, dielectric fluid compositions as described herein that additionally comprise metal passivators have been found to exhibit low fluid Dielectric Dissipation Factor values (and therefore reduced electrostatic charging tendency), even under conditions of long term oxidative stress.

In an aspect, the metal passivator is selected from benzotriazole or its derivatives. In an aspect, the metal passivator is selected from N,N-bis(2-ethylhexyl)-ar-methyl-1H-Benzotriazole-1-methanamine (commercially available, for example, as Irgamet 39); N,N-bis(2-ethylhexyl)-1H-1,2,4-Triazole-1-methanamine (commercially available, for example, as Irgamet 30); 1H-Benzotriazole (commercially available, for example, as Irgamet BTZ); Methyl-1H-benzotriazole (commercially available, for example, as Irgamet TTZ); butyl-1H-benzotriazole; and 2,2'-[[(methyl-1H-benzotriazol-1-yl)methyl]imino]bis-ethanol (commercially available, for example, as Irgamet 42).

In an aspect, the metal passivator is optionally present in amount typically less than 100 ppm.

In an aspect, the total concentration of additives is less than 5% by weight of the bio-sourced oil dielectric fluid.

After the addition of additives, the bio-sourced oil is optionally circulated through a polishing filter array to assure that the desired specifications of impurity and/or particle removal are achieved.

The polishing filter array has the same performance requirements as discussed above in the context of the filters downstream from the adsorbent media array. By definition, the polishing filter, if employed, is the last filter array in the mobile apparatus, and therefore is selected to retain particles at the maximum particle size to be permitted in the bio-sourced oil dielectric fluid. In an aspect, the filters of the polishing filter array are selected to retain particles of 0.5 micron or larger. In an aspect, the filters of the polishing filter array have a beta rating of at least 800. In an aspect, the filters of the polishing filter array have a beta rating of at least 1000.

The resulting bio-sourced oil dielectric fluid is collected in a convenient container, which may, for example, be a drum, tank, or a tank-trailer or similar mobile storage vessel.

In an aspect, the bio-sourced oil dielectric fluid has a Dielectric Dissipation Factor of about 0.20% or less at 25° C. In an aspect, the bio-sourced oil dielectric fluid has a Dielectric Dissipation Factor of about 0.18% or less at 25° C. In an aspect, the bio-sourced oil dielectric fluid has a Dielectric Dissipation Factor of about 0.12% or less at 25° C. In an aspect, the bio-sourced oil dielectric fluid has a Dielectric Dissipation Factor of about 0.1% or less at 25° C. In an aspect, the bio-sourced oil dielectric fluid has a Dielectric Dissipation Factor of about 0.09% or less at 25° C. In an aspect, the bio-sourced oil dielectric fluid has a Dielectric Dissipation Factor of about 0.08% or less at 25° C.

In an aspect, the bio-sourced oil dielectric fluid has a Dielectric Dissipation Factor of from 0.005 to 0.2% at 25° C. In an aspect, the bio-sourced oil dielectric fluid has a Dielectric Dissipation Factor of from 0.005 to 0.18% at 25° C. In an aspect, the bio-sourced oil dielectric fluid has a Dielectric Dissipation Factor of from 0.005 to 0.15% at 25° C. In an aspect, the bio-sourced oil dielectric fluid has a Dielectric Dissipation Factor of from 0.005 to 0.12% at 25° C. In an aspect, the bio-sourced oil dielectric fluid has a Dielectric Dissipation Factor of from 0.01 to 0.2% at 25° C. In an aspect, the bio-sourced oil dielectric fluid has a Dielectric Dissipation Factor of from 0.01 to 0.18% at 25° C. In an aspect, the bio-sourced oil dielectric fluid has a Dielectric Dissipation Factor of from 0.01 to 0.15% at 25° C. In an aspect, the bio-sourced oil dielectric fluid has a Dielectric Dissipation Factor of from 0.01 to 0.12% at 25° C. In an aspect, the bio-sourced oil dielectric fluid has a Dielectric Dissipation Factor of from 0.03 to 0.2% at 25° C. In an aspect, the bio-sourced oil dielectric fluid has a Dielectric Dissipation Factor of from 0.03 to 0.18% at 25° C. In an aspect, the bio-sourced oil dielectric fluid has a Dielectric Dissipation Factor of from 0.03 to 0.15% at 25° C. In an aspect, the bio-sourced oil dielectric fluid has a Dielectric Dissipation Factor of from 0.03 to 0.12% at 25° C. In an aspect, the bio-sourced oil dielectric fluid has a Dielectric Dissipation Factor of from 0.05 to 0.2% at 25° C. In an aspect, the bio-sourced oil dielectric fluid has a Dielectric Dissipation Factor of from 0.05 to 0.18% at 25° C. In an aspect, the bio-sourced oil dielectric fluid has a Dielectric Dissipation Factor of from 0.05 to 0.15% at 25° C. In an aspect, the bio-sourced oil dielectric fluid has a Dielectric Dissipation Factor of from 0.05 to 0.12% at 25° C. In an aspect, the bio-sourced oil dielectric fluid has a Dielectric Dissipation Factor of from 0.07 to 0.15% at 25° C. In an aspect, the bio-sourced oil dielectric fluid has a Dielectric Dissipation Factor of from 0.08 to 0.15% at 25° C.

The bio-sourced oil dielectric fluid exhibits an Acid Value (AV) of 0.06 milligrams KOH/gram oil or less. In an aspect, the bio-sourced oil dielectric fluid exhibits an Acid Value (AV) of 0.03 milligrams KOH/gram oil or less. In an aspect, the bio-sourced oil dielectric fluid exhibits an Acid Value (AV) of from about 0.06 milligrams KOH/gram oil to about 0.01 milligrams KOH/gram oil. The Acid Value is determined as described in ASTM 0974-12 as Standard Test Method for Acid Base Number by Color-Indicator Titration."

The bio-sourced oil dielectric fluid exhibits a dielectric breakdown voltage of at least about 35 kilovolts (kV) measured at 25° C. In an aspect, the bio-sourced oil dielectric fluid has a breakdown voltage of from 50 kV to 100 kV measured at 25° C. In an aspect, the bio-sourced oil starting material has a breakdown voltage of from 60 kV to 100 kV measured at 25° C. The dielectric breakdown is determined in accordance with ASTM D1816-12 as "Standard Test Method for Dielectric Breakdown Voltage of Insulating Liquids Using VDE Electrodes."

The bio-sourced oil dielectric fluid exhibits a moisture content of less than about 25 ppm. In an aspect, the bio-sourced oil dielectric fluid has a moisture content of from about 25 ppm to about 5 ppm. In an aspect, the bio-sourced oil dielectric fluid has a moisture content of from about 20 ppm to about 5 ppm. The moisture content is determined in accordance with IEC 60814.

The bio-sourced oil dielectric fluid has a Pour Point as determined by ISO 3016 of about −5° C. or less. In an aspect, the bio-sourced oil dielectric fluid has a Pour Point of −10° C. or less. In an aspect, the bio-sourced oil dielectric fluid has a Pour Point of −20° C. or less. In an aspect, the bio-sourced oil dielectric fluid has a Pour Point of −25° C. or less. In an aspect, the bio-sourced oil dielectric fluid has a Pour Point of −30° C. or less. In an aspect, the bio-sourced oil dielectric fluid has a Pour Point of −45° C. or less.

In an aspect, the bio-sourced oil dielectric fluid exhibits an IFT of at least about 20 dynes/cm at 25° C. In an aspect, the bio-sourced oil dielectric fluid exhibits an IFT of at least about 22 dynes/cm at 25° C. The IFT value is determined at 25° C. using Standard Test Method D971-99a.

In an aspect, the bio-sourced oil dielectric fluid has a Fire Point of at least 300° C. as determined by ISO 2592. In an aspect, the dielectric fluid has a Fire Point of at least 310° C. as determined by ISO 2592.

In an aspect, the bio-sourced oil dielectric fluid has a Flash Point of at least 250° C. as determined by ISO 2719. In an aspect, when the oil of the dielectric fluid is a bio-sourced oil, the dielectric fluid has a Flash Point of at least 270° C. as determined by ISO 2719.

In an aspect, the bio-sourced oil dielectric fluid has a Gardner color of 1 or less.

In an aspect, the bio-sourced oil dielectric fluid has a relative density of about 0.96 $kg/m^3$ or less at 15° C. as determined by ASTM D1298.

In an aspect, the bio-sourced oil dielectric fluid has a Kinematic Viscosity of from about 1 to 15 $mm^2/s$ at 100° C., or has a Kinematic viscosity of from about 1 to 35 $mm^2/s$ at 40° C., or has a Kinematic viscosity of from about 20 to 35 $mm^2/s$ at 40° C., or has a Kinematic viscosity of from about 100 to 3000 $mm^2/s$ at −20° C. as determined by ISO 3104. In an aspect, the bio-sourced oil dielectric fluid has a Kinematic viscosity of from about 9 to 50 $mm^2/s$ at 40° C. In an aspect, the bio-sourced oil dielectric fluid has a Kinematic viscosity of from about 9 to 50 $mm^2/s$ at 40° C. Kinematic Viscosity is determined by the test method of ISO 3104.

In an aspect, the bio-sourced oil dielectric fluid has a peroxide value of from about 0.01 to 5, or has a peroxide value of from about 0.01 to 3, or has a peroxide value of from about 0.01 to 2, or has a peroxide value of from about 0.01 to 1, or has a peroxide value of from about 0.1 to 1.2. For purposes of the present disclosure, "peroxide value" is determined by AOCS Method Cd 8b-90.

In an aspect, the bio-sourced oil dielectric fluid is free of silicone compounds, and/or is free of phospholipids, and/or is free of pigments, and/or is free of lecithin, and/or is free of fatty acids, and/or is free of mono- and di-glycerides, and/or is free of mineral acids, and/or is free of mineral oil, and/or is free of alcohols, and/or is free of colored impurities (i.e. non-bio-sourced oil materials that are not intentionally added to the fluid for the primary purpose of imparting a desired color), and/or is free of sulfur compounds, and/or is free of cresols, and/or is free of polyaromatic hydrocarbons, and/or is free of halogenated compounds, and/or is free of amines. For purposes of the present discussion, the bio-sourced oil dielectric fluid is considered to be free of a given material if no more than 1 ppm of the material can be detected.

The present method as described above is carried out using a unique mobile apparatus that is provided with special features to permit processing of bio-sourced oil to provide dielectric fluid in economically at geographically convenient locations. In particular, the mobile apparatus is configured so that the pressure differential of the bio-sourced oil when it is flowing through the adsorbent media array or one or more filter arrays is not greater than about 300 kPa.

Additionally, present method as described above is carried out using a unique mobile apparatus that is configured so that is capable of being operated on an electrical supply of from about 100 kW to about 2000 kW of power. In an aspect, the mobile apparatus as described herein is capable of being operated on an electrical supply of from about 100 kW to about 1200 kW of power. In an aspect, the mobile apparatus as described herein is capable of being operated on an electrical supply of from about 100 kW to about 500 kW of power. In an aspect, the mobile apparatus as described herein is capable of being operated on an electrical supply of from about 100 kW to about 300 kW of power. In an aspect, the mobile apparatus as described herein is capable of being operated on an electrical supply of from about 100 kW to about 250 kW of power. An example of a suitable generator for operation of the present mobile apparatus is a 135 kW 50 Hz 240/380 V power supply generator.

In an aspect, present method as described above is carried out using a unique mobile apparatus that is mounted on a mobile transport platform system having a total footprint of no more than about 30 $m^2$. In an aspect, the mobile apparatus (not including source tanks and finished product tanks) has a footprint of no more than about 30 $m^2$. This is in stark contrast to conventional process conditions, where a standard processing facility has a footprint of greater than 225 $m^2$. In an aspect, the mobile apparatus as described herein has a footprint capable of fitting in a standard 40 ft shipping container (i.e. a container having an external length of 40 ft. (12.18 m) and a internal width of 7 ft. 8 in. (2.31 m). In an aspect, the mobile apparatus as described herein (not including source tanks and finished product tanks) has a footprint capable of fitting in a standard 40 ft shipping container (i.e. a container having an external length of 40 ft. (12.18 m) and an internal width of 7 ft. 8 in. (2.31 m). In an aspect, the mobile apparatus as described herein has a three dimensional size (not including source tanks and finished product tanks) capable of fitting in a standard 20 ft High-Cube shipping container (i.e. a container having a length of 5.89M, a width of 2.35M, and a height of 2.69M; i.e. a total volume of 37 m 3).

Figure 2:
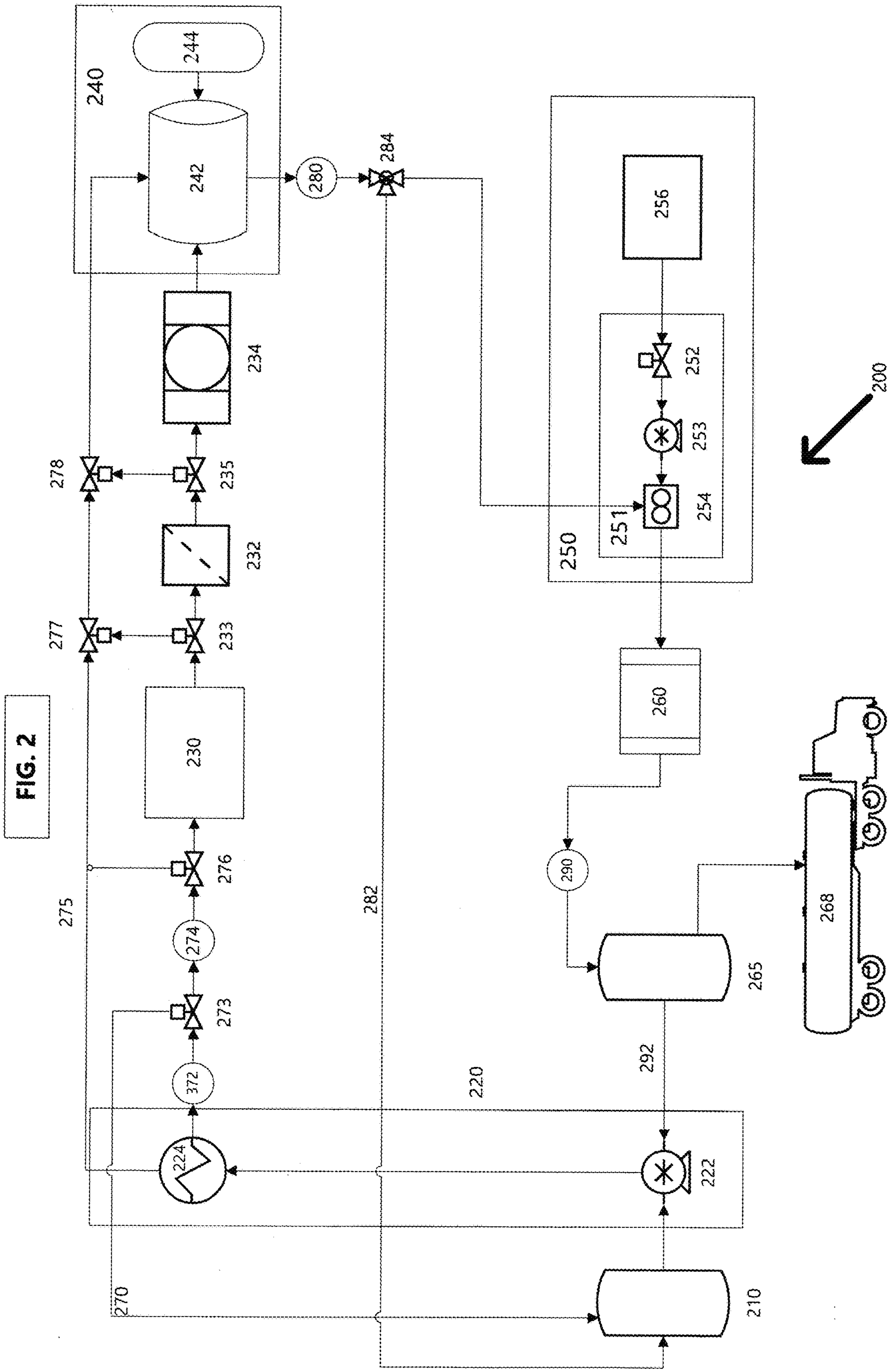
FIG. 2 is a schematic process flow diagram of an aspect of a mobile apparatus for processing a bio-sourced oil to provide a bio-sourced oil dielectric fluid.

FIG. 2 shows an aspect of a mobile apparatus 200 for processing a bio-sourced oil to provide a bio-sourced oil dielectric fluid as a schematic process flow diagram. In this apparatus, bio-sourced oil is provided in bio-sourced oil tank 210. A pump and heater array 220 comprising pump 222 and heater 224 is fluidly connected to receive oil from the bio-sourced oil tank. The pump and heater array 220 heats the bio-sourced oil to a temperature of at least about 60° C., or to a temperature of from about 60° C. to about 80° C., for carrying out subsequent treatments. The temperature of the bio-sourced oil during the process carried out by the present apparatus is higher than the temperature of processing of bio-sourced oil in a conventional large scale plant. In an aspect, the temperature of the bio-sourced oil is from about 60° C. to about 80° C. during filtration steps in the present method, which is higher than a typical temperature of filtration of from about 4° C. to about 60° C. in a conventional bio-sourced oil treatment plant. In an aspect, the temperature of the bio-sourced oil is from about 70° C. to about 80° C. during degassing steps in the present method, which is higher, and in most cases much higher, than a typical temperature of degassing in a conventional bio-sourced oil treatment plant.

In an aspect, the oil is heated to a temperature range of from about 60° C. to about 80° C. throughout the mobile apparatus to provide an advantageous viscosity for processing of the oil in the filters and handling in general.

In an aspect, the temperature of the bio-sourced oil emerging from pump and heater array 220 is measured at temperature test station 272, and if the temperature is not high enough, the bio-sourced oil is redirected by heating recycle valve 273 through heating recycle loop 270 to bio-sourced oil tank 210. In this way, stepwise heating of the bio-sourced oil is facilitated. Stepwise heating is advantageous in that the oil is not heated too quickly, with the potential for degradation or reaction of components in the oil. Additionally, stepwise heating is advantageous to reduce energy demand at any given time by distributing the energy load over a longer time period. Stepwise heating is particularly advantageous for use of the present mobile apparatus in locations where power capacity is limited. In an aspect, the pump and heater array is designed to heat the bio-sourced oil from a 20° C. start temperature to a temperature of at least about 60° C., or to a temperature of from about 60° C. to about 80° C., with a maximum power demand of 110 kW. In an aspect, the pump and heater array is designed to heat the bio-sourced oil from a 20° C. start temperature to a temperature of at least about 60° C., or to a temperature of from about 60° C. to about 80° C., with a maximum power demand of 90 kW. In an aspect, the pump and heater array is designed to heat the bio-sourced oil from a 20° C. start temperature to a temperature of at least about 60° C., or to a temperature of from about 60° C. to about 80° C., with a maximum power demand of 80 kW.

In an aspect, a test station is a sampling port wherein an aliquot of oil is withdrawn for testing to measure a oil characteristic of interest, such as temperature, Dielectric Dissipation Factor, Acid Value (AV), moisture content, Pour Point, dielectric breakdown voltage, IFT, Fire Point, Flash Point, Gardner color, density, Kinematic viscosity, and peroxide value. In an aspect, a test station is a sampling apparatus such as an in-line sensor to measure a oil characteristic of interest such as those listed above.

In an aspect, the mobile apparatus 200 is configured so that the temperature of the bio-sourced oil is from about 60° C. to about 80° C. during the steps of degassing and additive addition as discussed below. In an aspect, mobile apparatus 200 is configured to provide the desired temperature profile by incorporating a plurality multiple heaters upstream from different components in the apparatus.

In an aspect, the pump and heater array may comprise a plurality of pumps arranged serially or in parallel. In an aspect, the pump and heater array may comprise a plurality of heaters arranged serially or in parallel. In an aspect, the pump and heater array may comprise a plurality of pump and heater combinations arranged serially or in parallel.

Adsorbent media array 230 is fluidly connected to receive oil from the pump and heater array 220. In an aspect, the adsorbent media array 230 comprises a plurality of adsorbent media columns connected in parallel or in series. In an aspect, the adsorbent media array comprises from 2 to 8 adsorbent media columns connected in parallel. In an aspect, the adsorbent media array comprises from 3 to 6 adsorbent media columns connected in parallel. In an aspect, the adsorbent media array comprises from 1 to 5 adsorbent media columns connected in parallel. In an aspect, the adsorbent media array comprises from 2 to 8 adsorbent media columns connected in parallel, with control capability to hold one or more columns in standby mode while one or more columns are in use mode at any given time.

Figure 4:
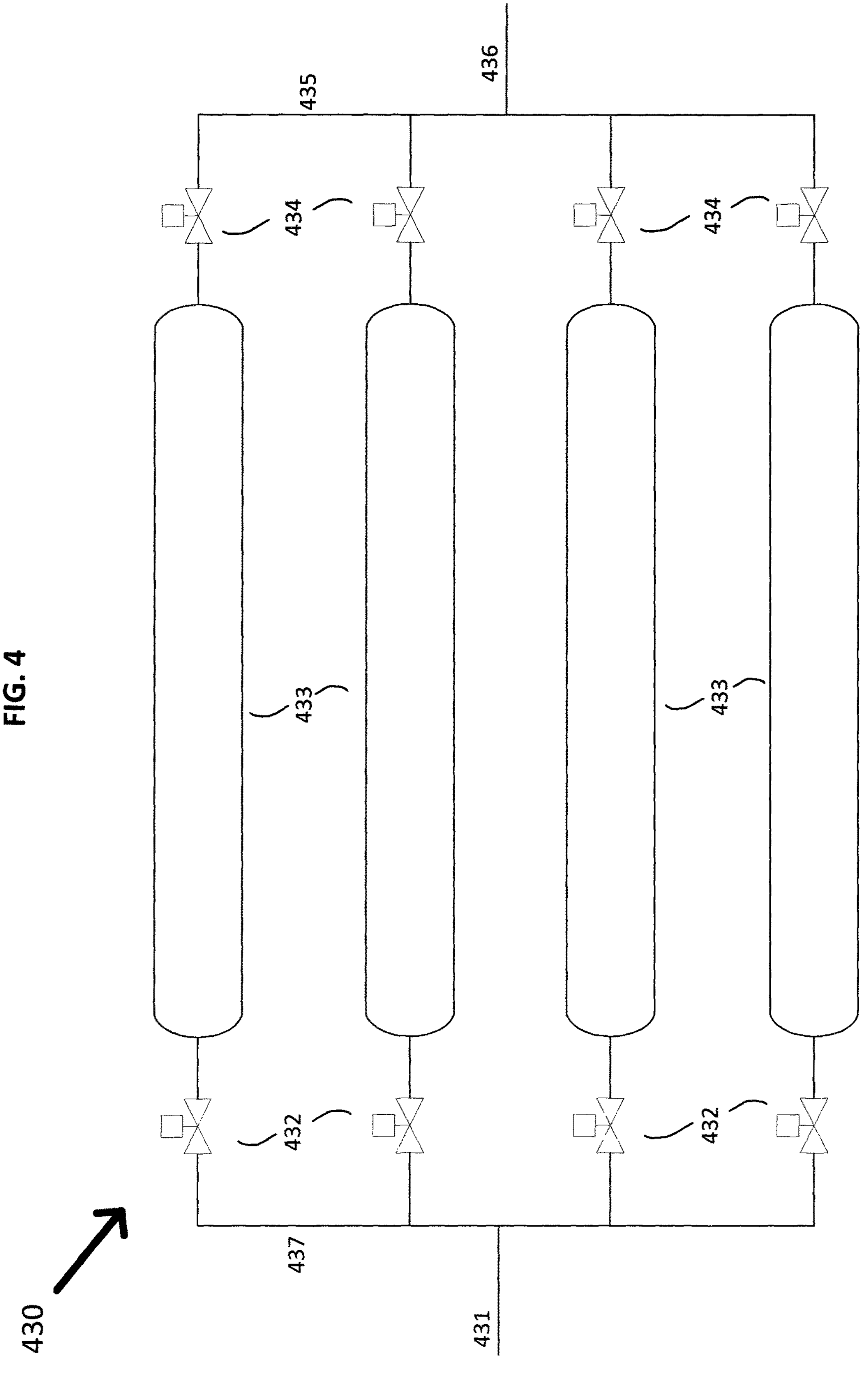
FIG. 4 is a schematic process flow diagram of an aspect an adsorbent media array that may be used in an aspect of a mobile apparatus.

An aspect an adsorbent media array that may be used in an aspect of a mobile apparatus is shown in the schematic process flow diagram of FIG. 4, wherein heated bio-sourced oil flows into adsorbent media array 430 through fluid line 431, and is then distributed via fluid line 437 to individual adsorbent media columns 433. The flow of the bio-sourced oil is controlled by individually operatable upstream valves 432 and individually operatable downstream valves 434. After treatment of the bio-sourced oil by individual adsorbent media columns 433, the separate streams of bio-sourced oil are directed by fluid line 435 to be combined at fluid line 436 for subsequent processing steps.

In an aspect, the adsorbent media columns of the adsorbent media array are connected in parallel to facilitate an average production flow rate of in each of the individual adsorbent media columns that is not greater than about 3 M3/H. In an aspect, the average production flow rate of in each of the individual adsorbent media columns is not greater than about 2 M3/H. In an aspect, the average production flow rate of in each of the individual adsorbent media columns is from about 0.2 M3/H to about 3 M3/H. In an aspect, the average production flow rate of in each of the individual adsorbent media columns is from about 0.5 M3/H to about 3 M3/H. In an aspect, the average production flow rate of in each of the individual adsorbent media columns is from about 1 M3/H to about 3 M3/H. In an aspect, the average production flow rate of in each of the individual adsorbent media columns is from about 0.2 M3/H to about 2 M3/H. In an aspect, the average production flow rate of in each of the individual adsorbent media columns is from about 0.5 M3/H to about 2 M3/H. In an aspect, the average production flow rate of in each of the individual adsorbent media columns is from about 1 M3/H to about 2 M3/H.

In an aspect, the adsorbent media columns are connected in parallel to facilitate a collective production flow rate through the adsorbent media array 230 of from about 4 M3/H to about 10 M3/H. In an aspect, the adsorbent media columns are connected in parallel to facilitate collective production flow rate through the adsorbent media array 230 of from about 6 M3/H to about 10 M3/H. In an aspect, the adsorbent media columns are connected in parallel to facilitate a collective production flow rate through the adsorbent media array 230 of from about 6 M3/H to about 9 M3/H.

In an aspect, the adsorbent media columns are reusable adsorbent media cannisters. For purposes of the present discussion, a reusable cannister is a cannister fitted with at least a bottom retention screen and containing adsorbent media, configured so that the adsorbent media may be removed from the cannister and replaced with fresh adsorbent media. In an aspect, the reusable cannister is configured to be removable from the apparatus to facilitate removal of the adsorbent media therefrom, and re-installed into the apparatus after replacing the adsorbent media with fresh adsorbent media. In an aspect, the adsorbent media columns are modular cartridges filled with adsorbent media. For purposes of the present discussion, a modular cartridge is a pre-assembled cartridge fitted with at least a bottom retention screen and containing adsorbent media that is configured to be removed from the apparatus and replaced with a replacement modular cartridge.

It has been found to be advantageous to carry out the present method so that the pressure differential of the bio-sourced oil when it is flowing through the mobile apparatus is not greater than about 300 kPa. In an aspect, the present method is carried out so that the pressure differential of the bio-sourced oil when it is flowing through the adsorbent media array or any of the filter arrays is from about 100 kPa to about 300 kPa. In an aspect, the present method is carried out so that the pressure differential of the bio-sourced oil when it is flowing through the adsorbent media array or any of the filter arrays is from about 100 kPa to about 250 kPa.

The adsorbent media of adsorbent media array 230 comprise solid adsorbent media selected from materials that remove polar impurities from bio-sourced oil. In an aspect, the adsorbent media for removal of polar impurities to be used in the adsorbent media columns of adsorbent media array 230 may be selected by a screening test as described above. Likewise, aspects of specific adsorbent media may be selected as described above.

In an aspect, the heated bio-sourced oil may additionally be circulated through an acid reducing adsorbent media array (not shown), wherein the adsorbent medial is selected to reduce acids in the bio-sourced oil as described above. In an aspect, the acid reducing adsorbent media array is located between the pump and heater array 220 and adsorbent media array 230. In an aspect, the acid reducing adsorbent media array is located between the adsorbent media array 230 and the first filter array 232, discussed below.

First filter array 232 is fluidly connected to receive oil from the adsorbent media array 230, wherein the first filter array removes fines from the oil. The filters of first filter array 232 are prepared from filter media and have performance characteristics as described above. In an aspect, the filters of the first filter array are selected to retain particles of 10 microns or larger. In an aspect, the filters of the first filter array are selected to retain particles of 5 microns or larger. In an aspect, the filters of the first filter array have a beta rating of at least 200. In an aspect, the filters of the first filter array have a beta rating of at least 500. In an aspect, the filters of the first filter array have a beta rating of at least 800. In an aspect, the filters of the first filter array have a beta rating of at least 1000.

Second filter array 234 is fluidly connected to receive oil from the first filter array 232, wherein the second filter array 234 removes impurities and/or particles that are not captured by first filter array 234. The filters of second filter array 234 are prepared from filter media and have performance characteristics as described above. In an aspect, the filters of the second filter array are selected to retain particles of 5 microns or larger. In an aspect, the filters of the second filter array are selected to retain particles of 1 micron or larger. In an aspect, the filters of the second filter array are selected to retain particles of 0.5 micron or larger. In an aspect, the filters of the second filter array have a beta rating of at least 800. In an aspect, the filters of the second filter array have a beta rating of at least 1000. It has been found that the use of filters having a beta rating of at least about 800 provide superior protection to the degasser from particulate fouling.

In an aspect, each of the filter arrays described herein (including first filter array 232, second filter array 234, and polishing filter array 260) comprise a plurality of filter columns connected in parallel or in series. In an aspect, any given filter array comprises from 2 to 8 filter columns connected in parallel. In an aspect, any given filter array comprises from 3 to 6 filter columns connected in parallel. In an aspect, any given filter array comprises from 3 to 5 filter columns connected in parallel. In an aspect, the filter array comprises from 2 to 8 filter columns connected in parallel, with control capability to hold one or more columns in standby mode while one or more columns are in use mode at any given time. In an aspect, each of the filter arrays is configured in the same manner as that of the adsorbent media array as shown in FIG. 4 as discussed above.

Degasser and vacuum system array 240 is fluidly connected to receive oil from the second filter array 234. Degasser and vacuum system array 240 comprises degasser 242 that allows removal of moisture and dissolved gasses from the bio-sourced oil and vacuum system 244 that generates a vacuum adequate for degassing the fluid and removing moisture from the oil.

In an aspect, degasser and vacuum system array 240 reduces the moisture content of the bio-sourced oil starting material from over 100 ppm to a bio-sourced oil dielectric fluid moisture content of about 40 ppm or below. In an aspect, the degasser and vacuum system array 240 reduces the moisture content of the bio-sourced oil starting material from over 100 ppm to a bio-sourced oil dielectric fluid moisture content of about 25 ppm or below. In an aspect, the degasser and vacuum system array 240 reduces the moisture content of the bio-sourced oil starting material from 100 ppm to 400 ppm to a bio-sourced oil dielectric fluid moisture content of about 25 ppm or below. In an aspect, a low final moisture content is achieved by a plurality of passes of the bio-sourced oil through the degasser and vacuum system array, either directly or by recirculation through the apparatus starting at any point, such as the pump and heater array, the adsorbent media array, the first filter array, or the second filter array.

In an aspect, this low moisture content is achieved by recirculation of the bio-sourced oil through degasser and vacuum system array 240 directly, or by recirculation through the system beginning at bio-sourced oil tank 210, pump and heater array 220, adsorbent media array 230, first filter array 232, or second filter array 234.

Metering/mixing valve system and additives source array 250 is fluidly connected to receive oil from the degasser and vacuum system array 240. Metering/mixing valve system and additives source array 250 comprises metering/mixing valve system 251 and additives source 256. Additives source 256 may be carried on the mobile transport platform, or alternatively may be separately provided and positioned adjacent the mobile transport platform and fluidly connected to the metering/mixing valve system 251. The metering/mixing valve system 251 comprises metering valve 252, pump 253, and mixing apparatus 254.

The metering/mixing valve system 250 facilitates and regulates the introduction of additives. The additives are generally metered as a concentrate solution into the bio-sourced oil. The additives can be metered into the oil by volume, weight, or flow rate to bring the final concentration of additives in the bio-sourced oil dielectric fluid to the proper levels.

Additives to be added in the form of a liquid to the bio-sourced oil at this stage of the method include suitable chemical substances which are deliberately added to bio-sourced oil insulating fluids in order to improve certain characteristics, e.g., pour point, viscosity, foaming, oxidation, electrostatic charging tendency depressant, metal passivator or deactivators, antifoam agent, refining process improvers, and optional colorants. It has been found to be highly advantageous to provide additives only in liquid form to facilitate ease of mixing of the additives with the bio-sourced oil and to provide uniform in line mixing. Additionally, providing additives in the form of a liquid to the bio-sourced oil in the mobile apparatus as described herein avoids the necessity of incorporating solids handling equipment with the mobile apparatus, and additionally avoids the need to undertake complex steps of solids handling in the method as carried out using the mobile apparatus.

Polishing filter array 260 is fluidly connected to receive oil from the metering/mixing valve system and additives source tank array 250. The filters of polishing filter array 260 are prepared from filter media and have performance characteristics as described above. In an aspect, the filters of the polishing filter array are selected to retain particles of 0.5 micron or larger. In an aspect, the filters of the polishing filter array have a beta rating of at least 800. In an aspect, the filters of the polishing filter array have a beta rating of at least 1000.

Finished product tank 265 is fluidly connected to receive oil from the polishing filter array 260.

In an aspect, at least one characteristic of the bio-sourced oil emerging from pump and heater array 220 is measured at pre-filter test station 274, depending on whether any of the product requirements at this stage in the method are satisfied, the bio-sourced oil may be redirected through first bypass loop 275 to bypass one or more of the adsorbent media array 230, the first filter array 232 or the second filter array 234 to degasser and vacuum system array 240 by operation of adsorbent filter bypass valve 276, first filter bypass valves 233 and 277, and/or second filter bypass valves 235 and 278. In an aspect, the oil characteristics measured at pre-filter test station 274 comprise measurement of the Dielectric Dissipation Factor and/or the Acid Value. In an aspect, if the Dielectric Dissipation Factor as measured at pre-filter test station 274 is less than 0.20% at 25° C. the bio-sourced oil is redirected through first bypass loop 275 to bypass at least the adsorbent media array 230.

In an aspect, at least one characteristic of the bio-sourced oil emerging from degasser and vacuum system array 240 is measured at post-degasser test station 280. In an aspect, the oil characteristics measured at post-degasser test station 280 comprises Dielectric Dissipation Factor and/or the Acid Value and/or moisture content.

If the product requirements at this stage in the method are not satisfied, the bio-sourced oil is redirected through first recycle loop 282 by operation of post-degasser bypass valve 284 to run through the pump and heater array 220 and the filter systems again. As shown in FIG. 2, the bio-sourced oil is redirected to bio-sourced oil tank 210 for convenience for staging and mixing prior to heating. Alternatively, the bio-sourced oil may be redirected to an intermediate staging tank, or directly to the pump and heater array 220.

In an aspect, if the Dielectric Dissipation Factor as measured at post-degasser test station 280 is less than 0.20% at 25° C. the bio-sourced oil is redirected through first recycle loop 282 by operation of post-degasser bypass valve 284 to run through the pump and heater array 220 and the filter systems again. In an aspect, if the moisture content as measured at post-degasser test station 280 is about 25 ppm, the bio-sourced oil is redirected through first recycle loop 282 and optionally by operation of adsorbent filter bypass valve 276 directly to degasser and vacuum system array 240. In an aspect, bio-sourced oil is cycled repeatedly through degasser and vacuum system array 240 until the desired the moisture content specification is achieved.

In an aspect, at least one characteristic of the bio-sourced oil emerging downstream from the metering/mixing valve system and additives source array 250 is measured at post-metering test station 290, and if the desired product specifications at this stage in the method are not satisfied, the bio-sourced oil is redirected through second recycle loop 292 by operation of a post-metering bypass valve to run through the pump and heater array 220 and the filter systems again. As shown in FIG. 2, post-metering test station 290 is located immediately downstream from polishing filter array 260. Alternatively, post-metering test station 290 may be located, for example, between metering/mixing valve system and additives source array 250 and polishing filter array 260, or optionally inside or adjacent finished product tank 265. As shown in FIG. 2, the bio-sourced oil is allowed to enter finished product tank 265 and then is redirected through second recycle loop 292 by operation of a post-metering bypass valve located at finished product tank 265. Alternatively, the post-metering bypass valve is located immediately downstream from the post-metering test station, which in turn may be located in the alternative locations as indicated above.

In an aspect, the characteristics of the bio-sourced oil measured at post-degasser test station 290 comprise at least one of Dielectric Dissipation Factor, pour point, moisture content, Acid Value, Gardner Color, density, viscosity, flash point and fire point.

As shown in FIG. 2, the bio-sourced oil being redirected through second recycle loop 292 is redirected directly to the pump and heater array 220. Alternatively, the bio-sourced oil may be redirected to bio-sourced oil tank 210 or to an intermediate staging tank for convenience for staging and mixing prior to heating.

Upon completion of the treatment of the bio-sourced oil such that the oil meets the desired performance specifications, the finished product bio-sourced oil dielectric fluid is directed to finished product tank 265 for temporary storage and to facilitate transfer to transfer tank 268, which is readily transportable. In an aspect, transfer tank 268 is a truck or truck-trailer tank. In an aspect, transfer tank 268 is a railroad car tank.

In an aspect, the finished product tank 265 itself is a readily transportable tank, dispensing with the need for a separate transfer tank 268.

In an aspect, finished product tank 265 is physically located on the mobile transport platform. Alternatively, in an aspect, finished product tank 265 is not physically located on the mobile transport platform. Providing the finished product tank 265 in an aspect as a component that is physically separate from (but fluidly connected to) components of the mobile transport platform is advantageous, because such storage tanks are readily available and relatively easily replaceable, and do not perform a specialized function in the method performed in processing of a bio-sourced oil to provide a bio-sourced oil dielectric fluid as described herein. In this aspect, key components of the mobile transport platform can be assembled on a comparatively small-sized platform at a manufacturing facility and shipped to a destination of intended use, and the finished product tank 265 can be economically shipped separately or locally sourced.

Likewise, in an aspect bio-sourced oil tank 210 is physically located on the mobile transport platform. Alternatively, in an aspect, bio-sourced oil tank 210 is not physically located on the mobile transport platform. Providing the bio-sourced oil tank 210 in an aspect as a component that is physically separate from (but fluidly connected to) components of the mobile transport platform is advantageous, because such storage tanks are readily available and relatively easily replaceable, and do not perform a specialized function in the method performed in processing of a bio-sourced oil to provide a bio-sourced oil dielectric fluid as described herein. In this aspect, key components of the mobile transport platform can be assembled on a comparatively small-sized platform at a manufacturing facility and shipped to destination of intended use, and the bio-sourced oil tank 210 can be economically shipped separately or locally sourced.

Figure 3:
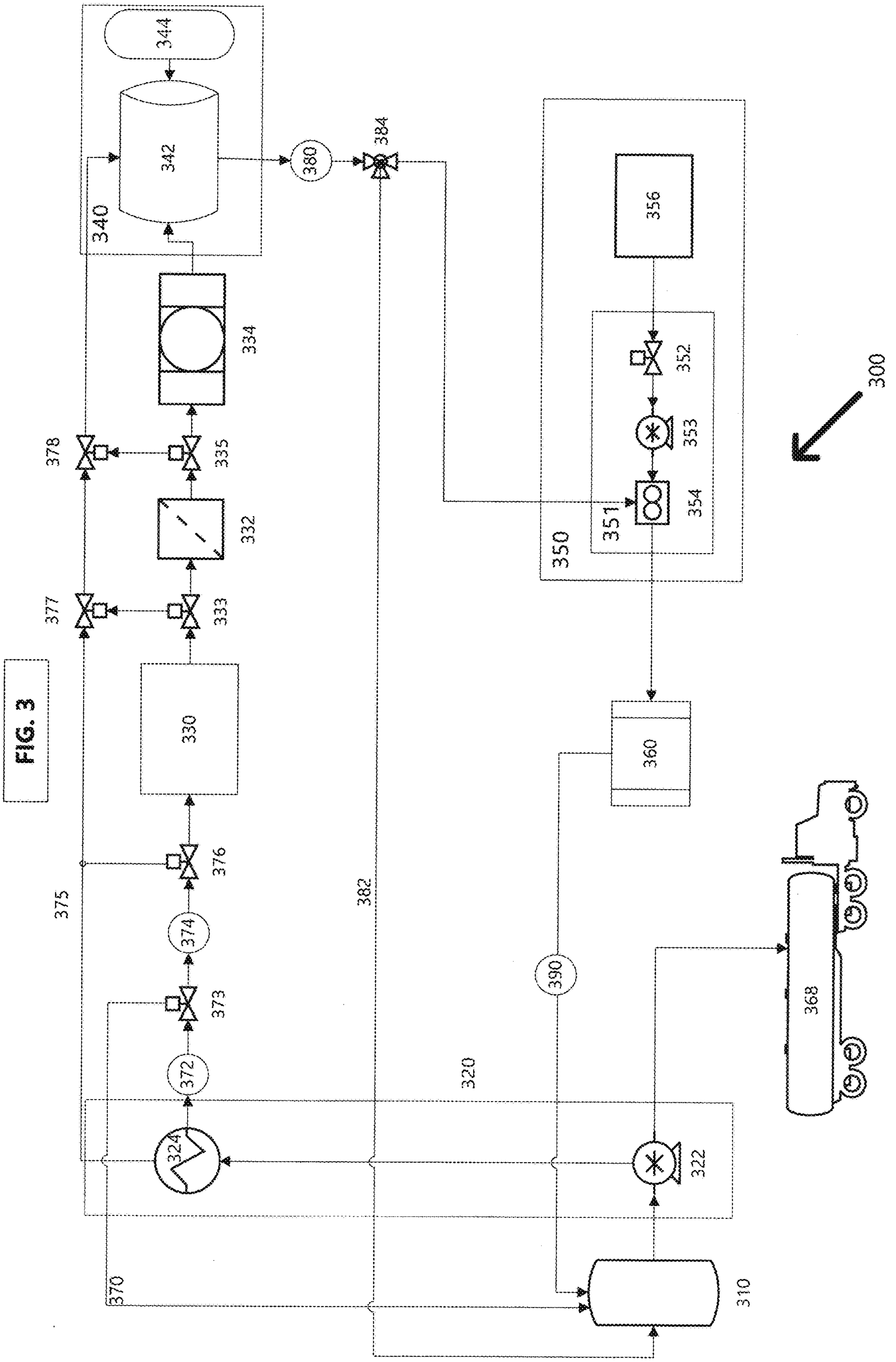
FIG. 3 is a schematic process flow diagram of an alternative aspect of a mobile apparatus for processing a bio-sourced oil to provide a bio-sourced oil dielectric fluid.

FIG. 3 shows an aspect of a mobile apparatus 300 for processing a bio-sourced oil to provide a bio-sourced oil dielectric fluid as a schematic process flow diagram. In this apparatus, bio-sourced oil is provided in bio-sourced oil tank 310. A pump and heater array 320 comprising pump 322 and heater 324 is fluidly connected to receive oil from the bio-sourced oil tank. The pump and heater array 320 heats the bio-sourced oil to temperatures as discussed above in the context of FIG. 2.

In an aspect, the temperature of the bio-sourced oil emerging from pump and heater array 320 is measured at temperature test station 372, and if the temperature is not high enough, the bio-sourced oil is redirected by heating recycle valve 373 through heating recycle loop 370 to bio-sourced oil tank 310. In this way, stepwise heating of the bio-sourced oil is facilitated as discussed above in the context of FIG. 2.

Adsorbent media array 330 is fluidly connected to receive oil from the pump and heater array 320. In an aspect, the adsorbent media array 330 comprises a plurality of adsorbent media columns connected in parallel or in series as discussed above in the context of FIG. 2.

The adsorbent media of adsorbent media array 330 comprise solid adsorbent media selected from materials that remove polar impurities from bio-sourced oil as discussed above in the context of FIG. 2.

In an aspect, the heated bio-sourced oil may additionally be circulated through an acid reducing adsorbent media array (not shown), wherein the adsorbent medial is selected to reduce acids in the bio-sourced oil as described above. In an aspect, the acid reducing adsorbent media array is located between the pump and heater array 320 and adsorbent media array 330. In an aspect, the acid reducing adsorbent media array is located between the adsorbent media array 330 and the first filter array 332, discussed below.

First filter array 332 is fluidly connected to receive oil from the adsorbent media array 330, wherein the first filter array removes fines from the oil. The filters of first filter array 332 are prepared from filter media and have performance characteristics as discussed above in the context of FIG. 2.

Second filter array 334 is fluidly connected to receive oil from the first filter array 332, wherein the second filter array 334 removes impurities and/or particles that are not captured by first filter array 334. The filters of second filter array 334 are prepared from filter media and have performance characteristics as discussed above in the context of FIG. 2.

In an aspect, each of the filter arrays described herein (including first filter array 332, second filter array 334, and polishing filter array 360) comprise a plurality of filter columns connected in parallel or in series as discussed above in the context of FIG. 2.

Degasser and vacuum system array 340 is fluidly connected to receive oil from the second filter array 334. Degasser and vacuum system array 340 comprises degasser 342 that allows removal of moisture and dissolved gasses from the bio-sourced oil and vacuum system 344 that generates a vacuum adequate for degassing the fluid and removing moisture from the oil as discussed above in the context of FIG. 2. In an aspect, a low moisture content is achieved by recirculation of the bio-sourced oil through degasser and vacuum system array 340 directly, or by recirculation through the system beginning at bio-sourced oil tank 310, pump and heater array 320, adsorbent media array 330, first filter array 332, or second filter array 334.

Metering/mixing valve system and additives source array 350 is fluidly connected to receive oil from the degasser and vacuum system array 340. Metering/mixing valve system and additives source array 350 comprises metering/mixing valve system 351 and additives source 356, which may be carried on the mobile transport platform, or alternatively may be separately provided and positioned adjacent the mobile transport platform and fluidly connected to the metering/mixing valve system 351. The metering/mixing valve system 351 comprises metering valve 352, pump 353, and mixing apparatus 354. The metering/mixing valve system 350 facilitates and regulates the introduction of additives as discussed above in the context of FIG. 2.

Polishing filter array 360 is fluidly connected to receive oil from the metering/mixing valve system and additives source tank array 350. The filters of polishing filter array 360 are prepared from filter media and have performance characteristics as described above.

In an aspect, at least one characteristic of the bio-sourced oil emerging from degasser and vacuum system array 340 is measured at post-degasser test station 380. In an aspect, the oil characteristics measured at post-degasser test station 380 comprises Dielectric Dissipation Factor and/or the Acid Value and/or moisture content.

If the product requirements at this stage in the method are not satisfied, the bio-sourced oil is redirected through first recycle loop 382 by operation of post-degasser bypass valve 384 to return directly to bio-sourced oil tank 310, to be mixed with yet untreated bio-sourced oil starting materials. Bio-sourced oil is continuously drawn from bio-sourced oil tank 310 and run through the pump and heater array 320, the filter systems and degasser and vacuum system array 340 again. This cycle is repeated until the oil characteristics measured at post-degasser test station 380 satisfy specification requirements, indicating that the entire batch of bio-sourced oil starting material initially provided meets specifications.

Upon satisfaction of specification requirements at post-degasser test station 380, the bio-sourced oil is directed to metering/mixing valve system and additives source array 350, which comprises metering/mixing valve system 351 and additives source 356. Additives source array 350 may be carried on the mobile transport platform, or alternatively may be separately provided and positioned adjacent the mobile transport platform and fluidly connected to the metering/mixing valve system 351. The metering/mixing valve system 351 comprises metering valve 352, pump 353, and mixing apparatus 354. Additives are introduced to the bio-sourced oil at metering/mixing valve system and additives source array 350, as discussed above in the context of FIG. 2.

Polishing filter array 360 is fluidly connected to receive oil from the metering/mixing valve system and additives source tank array 350. The filters of polishing filter array 360 are prepared from filter media and have performance characteristics as discussed above in the context of FIG. 2.

In an aspect, at least one characteristic of the bio-sourced oil emerging downstream from the metering/mixing valve system and additives source array 350 is measured at post-metering test station 390 to confirm satisfaction of the desired final product bio-sourced oil dielectric fluid specifications. The thus prepared bio-sourced oil dielectric fluid is returned to bio-sourced oil tank 310 for temporary storage and to facilitate transfer to transfer tank 368, which is readily transportable. In an aspect, transfer tank 368 is a truck or truck-trailer tank. In an aspect, transfer tank 368 is a railroad car tank. Further aspects of transfer tank 368 are as discussed above in the context of FIG. 2.

In an aspect, the bio-sourced oil tank 310 itself is a readily transportable tank, dispensing with the need for a separate transfer tank 368.

In an aspect, at least one characteristic of the bio-sourced oil emerging from pump and heater array 320 is measured at pre-filter test station 374, depending on whether any of the product requirements at this stage in the method are satisfied, the bio-sourced oil may be redirected through first bypass loop 375 to bypass one or more of the adsorbent media array 330, the first filter array 332 or the second filter array 334 to degasser and vacuum system array 340 by operation of adsorbent filter bypass valve 376, first filter bypass valves 333 and 377, and/or second filter bypass valves 335 and 378. In an aspect, the oil characteristics measured at pre-filter test station 374 comprise measurement of the Dielectric Dissipation Factor and/or the Acid Value. In an aspect, if the Dielectric Dissipation Factor as measured at pre-filter test station 374 is less than 0.20% at 25° C. the bio-sourced oil is redirected through first bypass loop 375 to bypass at least the adsorbent media array 330.

In an aspect, the mobile apparatus for processing a bio-sourced oil to provide a bio-sourced oil dielectric fluid has a production capacity of from about 5 to about 40 MT per 24 hours of operation. In an aspect, the mobile apparatus has a production capacity of from about 10 to about 30 MT per 24 hours of operation. In an aspect, the mobile apparatus has a production capacity of from about 15 to about 30 MT per 24 hours of operation. In an aspect, the mobile apparatus has a production capacity of dielectric fluid of from about 3 to about 10 M3/H.

In an aspect, the mobile apparatus as described herein is capable of being operated on an electrical supply of from about 100 kW to about 2000 kW of power. In an aspect, the mobile apparatus as described herein is capable of being operated on an electrical supply of from about 100 kW to about 1200 kW of power. In an aspect, the mobile apparatus as described herein is capable of being operated on an electrical supply of from about 100 kW to about 500 kW of power. In an aspect, the mobile apparatus as described herein is capable of being operated on an electrical supply of from about 100 kW to about 300 kW of power. In an aspect, the mobile apparatus as described herein is capable of being operated on an electrical supply of from about 100 kW to about 250 kW of power. An example of a suitable generator for operation of the present mobile apparatus is a 135 kW 50 Hz 240/380 V power supply generator.

The ability to process bio-sourced oil to provide a bio-sourced oil dielectric fluid at this low power level is surprising, because typical plan operations have a much higher power demand in order to operate equipment to achieve appropriate commercial productivity. The relatively low power supply requirements of the present system is a significant advantage, because the mobile apparatus can be operated economically and in virtually any location due to the portability and ease in setting supporting the system at locations without significant infrastructure.

In an aspect, the mobile apparatus comprising the pump and heater array, adsorbent media array, one or more filter arrays, degasser and vacuum system array, additive metering/mixing valve system, and plumbing system (but not including source tanks and finished product tanks) has a footprint of no more than about 30 $m^2$. In an aspect, the mobile apparatus comprising the pump and heater array, adsorbent media array, one or more filter arrays, degasser and vacuum system array, additive metering/mixing valve system, and plumbing system (but not including source tanks and finished product tanks) has a footprint of no more than about 30 $m^2$. This is in stark contrast to conventional process conditions, where a standard processing facility typically has a footprint of greater than 225 $m^2$. In an aspect, the mobile apparatus comprising the pump and heater array, adsorbent media array, one or more filter arrays, degasser and vacuum system array, additive metering/mixing valve system, and plumbing system (but not including source tanks and finished product tanks) has a footprint capable of fitting in a standard 40 ft shipping container (i.e., a container having an external length of 40 ft. (12.18 m) and an internal width of 7 ft. 8 in. (2.31 m). In an aspect, the mobile apparatus comprising the pump and heater array, adsorbent media array, one or more filter arrays, degasser and vacuum system array, additive metering/mixing valve system, and plumbing system (but not including source tanks and finished product tanks) has a footprint capable of fitting in a standard 40 ft shipping container (i.e., a container having an external length of 40 ft. (12.18 m) and an internal width of 7 ft. 8 in. (2.31 m). In an aspect, the mobile apparatus comprising the pump and heater array, adsorbent media array, one or more filter arrays, degasser and vacuum system array, additive metering/mixing valve system, and plumbing system (but not including source tanks and finished product tanks) has a three-dimensional size capable of fitting in a standard 20 ft High-Cube shipping container (i.e. a container having a length of 5.89M, a width of 2.35M, and a height of 2.69M; i.e. a total volume of 37 m 3).

In an aspect, the mobile apparatus as described herein may further comprise buffer tanks, valves, control systems and like features to enhance the operation and control the process.

In an aspect, the mobile apparatus as described herein may further comprise storage and process tanks, totes, or containers that allow feeding base fluid and concentrated ingredients to the system and provide subsequent packaging or storage of the fluid after production of the bio-sourced oil dielectric fluid.

In an aspect, the mobile apparatus is located in convenient transportation distance miles of at least one dielectric fluid use site. Dielectric fluids are used electrical power equipment, such as transformers, circuit breakers, pipe-type cables, and the like.

In an aspect, the mobile apparatus is located in convenient transportation distance miles of at least one source of bio-sourced oil raw material or starting material. In an aspect, the mobile apparatus is co-located at a bio-sourced oil raw material or starting material production site.

In an aspect, the mobile apparatus as described herein is located at a site convenient to service the dielectric fluid needs of a region, such as an economic zone, county, state, province, or country.

In an aspect, the mobile apparatus as described herein is employed as one of a production fleet of at least three mobile apparatuses to service the dielectric fluid needs of a region. In an aspect, the mobile apparatus as described herein is employed as one of a production fleet of at least five mobile apparatuses to service the dielectric fluid needs of a region.

All percentages and ratios used herein are weight percentages and ratios unless otherwise indicated. All patents, patent applications (including provisional applications), and publications cited herein are incorporated by reference as if individually incorporated for all purposes. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

The invention claimed is:

1. A method of processing a bio-sourced oil to provide a bio-sourced oil dielectric fluid in a mobile apparatus comprising, providing a bio-sourced oil starting material;

heating the bio-sourced oil to a temperature of at least about 60° C.;

circulating the heated bio-sourced oil through an adsorbent media array, wherein the adsorbent media array removes polar impurities from the bio-sourced oil;

circulating the heated oil through one or more filter arrays, wherein the filter arrays in aggregate retain particles of 0.5 micron or larger with a beta rating of at least 200;

circulating the heated oil through a degasser and vacuum system array;

adding additives in liquid form comprising antioxidants, optional pour-point depressants, and optional colorant to the bio-sourced oil by use of an additive metering/mixing valve system to provide a bio-sourced oil dielectric fluid; and collecting the bio-sourced oil dielectric fluid;

wherein:

i) the bio-sourced oil is maintained at a temperature of at least about 60° C. throughout the method;

ii) the mobile apparatus is configured so that the pressure differential of the bio-sourced oil when it is flowing through the adsorbent media array or the one or more filter arrays is not greater than about 300 kPa, iii) the mobile apparatus is configured so that is capable of being operated on an electrical supply of from about 100 kW to about 2000 kW of power, and iv) the mobile apparatus is mounted on a mobile transport platform system having a total footprint of no more than about 30 $m^2$; and wherein the bio-sourced oil dielectric fluid exhibits:

(a) a Dielectric Dissipation Factor of about 0.2% or less at 25° C., (b) an Acid Value (AV) of less than about 0.09 milligrams KOH/gram oil, (c) a moisture content of about 25 ppm or less; and (d) a Pour Point of less than about −5° C.

2. The method of any claim 1, wherein the bio-sourced oil is a vegetable oil.

3. The method of claim 1, wherein the bio-sourced oil starting material has an Acid Value of from about 0.5 to about 0.01 milligrams KOH/gram oil; or wherein the bio-sourced oil starting material has an Acid Value about 0.06 milligrams KOH/gram oil or less; or wherein the bio-sourced oil starting material has an Acid Value of about 0.03 milligrams KOH/gram oil or less.

4. The method of claim 1, wherein the bio-sourced oil starting material has a moisture content of over about 100 ppm; or wherein the bio-sourced oil starting material has a moisture content of from about 100 ppm to about 400 ppm.

5. The method of claim 1, wherein the bio-sourced oil starting material has a Dielectric Dissipation Factor of at least 0.5% at 25° C., or wherein the bio-sourced oil starting material has a Dielectric Dissipation Factor of at least 0.7% at 25° C.; or wherein the bio-sourced oil starting material has a Dielectric Dissipation Factor of at least 0.8% at 25° C.; or wherein the bio-sourced oil starting material has a Dielectric Dissipation Factor of at least 0.9% at 25° C.; or wherein the bio-sourced oil starting material has a Dielectric Dissipation Factor of at least 1% at 25° C.

6. The method of claim 1, wherein the adsorbent media array comprises adsorbent media selected from attapulgite clays, bauxite clays, bentonite clays, silicates, aluminates, magnesium silicates, diatomaceous earths, fullers earths, bleaching clays, resins, and mixtures thereof.

7. The method of claim 1, wherein the adsorbent media array comprises adsorbent media that is a phyllosilicate clay material selected from halloysite, kaolinite, illite, montmorillonite, vermiculite, talc, sepiolite, attapulgite, and pyrophyllite.

8. The method of claim 1, wherein the adsorbent media array comprises solid adsorbent media having a particle size of from 30 to 90 mesh.

9. The method of claim 1, wherein the bio-sourced oil dielectric fluid has a Dielectric Dissipation Factor of about 0.18% or less at 25° C.; or wherein the bio-sourced oil dielectric fluid has a Dielectric Dissipation Factor of about 0.12% or less at 25° C.; or wherein the bio-sourced oil dielectric fluid has a Dielectric Dissipation Factor of about 0.1% or less at 25° C.; or wherein the bio-sourced oil dielectric fluid has a Dielectric Dissipation Factor of about 0.9% or less at 25° C.; or wherein the bio-sourced oil dielectric fluid has a Dielectric Dissipation Factor of about 0.08% or less at 25° C.

10. The method of claim 1, wherein the mobile apparatus is provided with a plurality of adsorbent media arrays in series, with a first adsorbent media array comprising media selected for reducing Acid Value and a second adsorbent media array comprising media selected for removing polar impurities.

11. The method of claim 1, wherein the one or more filter arrays comprise a first filter array, wherein the filters of the first filter array are selected to retain particles of 10 microns or larger; or wherein the filters of the first filter array are selected to retain particles of 5 microns or larger;

a second filter array, wherein the filters of the second filter array are selected to retain particles of 5 microns or larger, or wherein the filters of the second filter array are selected to retain particles of 1 micron or larger, or wherein the filters of the second filter array are selected to retain particles of 0.5 micron or larger; and a polishing filter array, wherein the filters of the polishing filter array are selected to retain particles of 0.5 micron or larger.

12. The method of claim 11, wherein:

the filters of the first filter array have a beta rating of at least 200, or wherein the filters of the first filter array have a beta rating of at least 500, or wherein the filters of the first filter array have a beta rating of at least 800, or wherein the filters of the first filter array have a beta rating of at least 1000;

the filters of the second filter array have a beta rating of at least 800, or wherein the filters of the second filter array have a beta rating of at least 1000; and the filters of the polishing filter array have a beta rating of at least 800, or wherein the filters of the polishing filter array have a beta rating of at least 1000.

13. The method of claim 1, wherein the bio-sourced oil dielectric fluid has an IFT of at least about 20 dynes/cm at 25° C.; or wherein the bio-sourced oil dielectric fluid has an IFT of at least about 22 dynes/cm at 25° C.

14. The method of claim 1, wherein the bio-sourced oil dielectric fluid has a breakdown voltage of at least about 35 kilovolts (kV) measured at 25° C., or wherein the bio-sourced oil dielectric fluid has a breakdown voltage of from 50 kV to 100 kV measured at 25° C.; or wherein the bio-sourced oil starting material has a breakdown voltage of from 60 kV to 100 kV measured at 25° C.

15. The method of claim 1, wherein the bio-sourced oil dielectric fluid has a moisture content of from about 25 ppm to about 5 ppm; or wherein the bio-sourced oil dielectric fluid has a moisture content of from about 20 ppm to about 5 ppm.

16. The method of claim 1, wherein the bio-sourced oil is maintained at a temperature of from about 60° to about 80° C. throughout the method.

* * * * *